(12) United States Patent
High et al.

(10) Patent No.: US 10,570,000 B2
(45) Date of Patent: *Feb. 25, 2020

(54) SHOPPING FACILITY ASSISTANCE OBJECT DETECTION SYSTEMS, DEVICES AND METHODS

(71) Applicant: Walmart Apollo, LLC, Bentonville, AR (US)

(72) Inventors: Donald R. High, Noel, MO (US); Michael D. Atchley, Springdale, AR (US); Karl Kay, Gentry, AR (US); Robert C. Taylor, Rogers, AR (US); David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 223 days.

This patent is subject to a terminal disclaimer.

(21) Appl. No.: 15/692,226

(22) Filed: Aug. 31, 2017

(65) Prior Publication Data

US 2018/0020896 A1 Jan. 25, 2018

Related U.S. Application Data

(63) Continuation of application No. 15/061,325, filed on Mar. 4, 2016, now Pat. No. 9,801,517.
(Continued)

(51) Int. Cl.
*B66F 9/06* (2006.01)
*G06Q 30/06* (2012.01)
(Continued)

(52) U.S. Cl.
CPC ............... *B66F 9/063* (2013.01); *A47F 3/08* (2013.01); *A47F 10/04* (2013.01); *A47F 13/00* (2013.01);
(Continued)

(58) Field of Classification Search
None
See application file for complete search history.

(56) References Cited

U.S. PATENT DOCUMENTS 1,774,653 A 9/1930 Marriott
2,669,345 A 2/1954 Brown
(Continued)

FOREIGN PATENT DOCUMENTS

CA 2524037 5/2006
CA 2625885 4/2007
(Continued)

OTHER PUBLICATIONS

Abbrobotics; "ABB Robotics—Innovative Packaging Solutions", https://www.youtube.com/watch?v=e5jif-IUvHY, published on May 16, 2013, pp. 1-5.
(Continued)

*Primary Examiner* — Krishnan Ramesh
(74) *Attorney, Agent, or Firm* — Fitch, Even, Tabin & Flannery LLP

(57) ABSTRACT

Some embodiments provide apparatuses and methods useful to providing control over movement of motorized transport units. In some embodiments, an apparatus providing control over movement of motorized transport units at a shopping facility comprises: a central computer system comprising: a transceiver; a control circuit; a memory coupled to the control circuit and storing computer instructions that when executed by the control circuit cause the control circuit to perform the steps of: obtain, from one or more of the communications received from the motorized transport unit, route condition information comprising information corresponding to an intended route of travel; obtain additional route condition information detected by one or more detectors external to the motorized transport unit; detect an object affecting the intended route of travel; identify an action to be
(Continued)

taken by the motorized transport unit with respect to the detected object; and communicate one or more instructions.

19 Claims, 11 Drawing Sheets

Related U.S. Application Data

(60) Provisional application No. 62/129,726, filed on Mar. 6, 2015, provisional application No. 62/129,727, filed on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.

| | | |
|---|---|---|
| *A47F 10/04* | (2006.01) | |
| *H04W 4/80* | (2018.01) | |
| *G06Q 10/06* | (2012.01) | |
| *H04W 4/021* | (2018.01) | |
| *H04W 4/029* | (2018.01) | |
| *G05D 1/02* | (2006.01) | |
| *B60L 53/36* | (2019.01) | |
| *B60L 53/63* | (2019.01) | |
| *E01H 5/06* | (2006.01) | |
| *E01H 5/12* | (2006.01) | |
| *G01S 1/02* | (2010.01) | |
| *G01S 1/70* | (2006.01) | |
| *G01S 1/72* | (2006.01) | |
| *G06Q 10/02* | (2012.01) | |
| *G06Q 10/08* | (2012.01) | |
| *G06Q 10/10* | (2012.01) | |
| *G06Q 10/00* | (2012.01) | |
| *G06Q 30/00* | (2012.01) | |
| *G06Q 30/02* | (2012.01) | |
| *G06Q 50/30* | (2012.01) | |
| *H04N 5/77* | (2006.01) | |
| *H04N 7/18* | (2006.01) | |
| *B62B 5/00* | (2006.01) | |
| *B60P 3/06* | (2006.01) | |
| *G06Q 50/28* | (2012.01) | |
| *G05D 1/00* | (2006.01) | |
| *H04W 4/33* | (2018.01) | |
| *G06T 7/73* | (2017.01) | |
| *G06T 7/593* | (2017.01) | |
| *H04N 13/282* | (2018.01) | |
| *A47L 11/40* | (2006.01) | |
| *G06K 9/00* | (2006.01) | |
| *G06K 9/18* | (2006.01) | |
| *G06K 9/32* | (2006.01) | |
| *G06K 9/62* | (2006.01) | |
| *G06K 9/78* | (2006.01) | |
| *G08G 1/00* | (2006.01) | |
| *G10L 13/04* | (2013.01) | |
| *G10L 15/22* | (2006.01) | |
| *G10L 17/22* | (2013.01) | |
| *H02J 7/00* | (2006.01) | |
| *H04B 10/116* | (2013.01) | |
| *H04L 29/08* | (2006.01) | |
| *H04W 4/30* | (2018.01) | |
| *A47F 13/00* | (2006.01) | |
| *B07C 5/28* | (2006.01) | |
| *B07C 5/342* | (2006.01) | |
| *B65F 3/00* | (2006.01) | |
| *G05B 19/048* | (2006.01) | |
| *G06F 3/01* | (2006.01) | |
| *H04W 4/02* | (2018.01) | |
| *H04W 4/40* | (2018.01) | |
| *G05D 1/04* | (2006.01) | |
| *A47F 3/08* | (2006.01) | |
| *G01C 21/20* | (2006.01) | |
| *G06F 21/60* | (2013.01) | |
| *H04L 29/06* | (2006.01) | |
| *G06Q 20/12* | (2012.01) | |
| *G06F 16/903* | (2019.01) | |
| *A47F 10/02* | (2006.01) | |
| *H04B 1/38* | (2015.01) | |
| *A47F 10/00* | (2006.01) | |
| *G05B 19/12* | (2006.01) | |
| *G06K 7/10* | (2006.01) | |
| *G06K 7/14* | (2006.01) | |

(52) U.S. Cl.
CPC ............ *A47L 11/4011* (2013.01); *B07C 5/28* (2013.01); *B07C 5/3422* (2013.01); *B60L 53/36* (2019.02); *B60L 53/63* (2019.02); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206*

(2013.01); *G01S 1/70* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06K 9/00208* (2013.01); *G06K 9/00671* (2013.01); *G06K 9/00711* (2013.01); *G06K 9/00771* (2013.01); *G06K 9/00791* (2013.01); *G06K 9/00805* (2013.01); *G06K 9/18* (2013.01); *G06K 9/3208* (2013.01); *G06K 9/6256* (2013.01); *G06K 9/78* (2013.01); *G06Q 10/02* (2013.01); *G06Q 10/0631* (2013.01); *G06Q 10/06311* (2013.01); *G06Q 10/083* (2013.01); *G06Q 10/087* (2013.01); *G06Q 10/1095* (2013.01); *G06Q 10/30* (2013.01); *G06Q 30/016* (2013.01); *G06Q 30/0281* (2013.01); *G06Q 30/0601* (2013.01); *G06Q 30/0605* (2013.01); *G06Q 30/0613* (2013.01); *G06Q 30/0617* (2013.01); *G06Q 30/0619* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01); *G06Q 50/28* (2013.01); *G06Q 50/30* (2013.01); *G06T 7/593* (2017.01); *G06T 7/74* (2017.01); *G08G 1/20* (2013.01); *G10L 13/043* (2013.01); *G10L 15/22* (2013.01); *G10L 17/22* (2013.01); *H02J 7/0027* (2013.01); *H04B 10/116* (2013.01); *H04L 67/12* (2013.01); *H04L 67/141* (2013.01); *H04L 67/143* (2013.01); *H04N 5/77* (2013.01); *H04N 7/18* (2013.01); *H04N 7/183* (2013.01); *H04N 7/185* (2013.01); *H04N 13/282* (2018.05); *H04W 4/02* (2013.01); *H04W 4/021* (2013.01); *H04W 4/029* (2018.02); *H04W 4/30* (2018.02); *H04W 4/33* (2018.02); *H04W 4/40* (2018.02); *H04W 4/80* (2018.02); *A47F 2010/005* (2013.01); *A47F 2010/025* (2013.01); *A47L 2201/04* (2013.01); *B07C 2501/0045* (2013.01); *B07C 2501/0054* (2013.01); *B07C 2501/0063* (2013.01); *B60Y 2410/10* (2013.01); *B65F 2210/168* (2013.01); *G05B 19/124* (2013.01); *G05B 2219/23363* (2013.01); *G05B 2219/39107* (2013.01); *G05D 2201/0203* (2013.01); *G05D 2201/0216* (2013.01); *G06F 16/90335* (2019.01); *G06F 21/606* (2013.01); *G06K 7/10297* (2013.01); *G06K 7/10821* (2013.01); *G06K 7/1413* (2013.01); *G06K 9/00624* (2013.01); *G06K 2009/00738* (2013.01); *G06Q 10/06315* (2013.01); *G06Q 20/12* (2013.01); *G06T 2207/10028* (2013.01); *G10L 2015/223* (2013.01); *H02J 2007/0096* (2013.01); *H04B 1/38* (2013.01); *H04L 63/06* (2013.01); *H04L 63/08* (2013.01); *H04L 63/0846* (2013.01); *Y02W 30/82* (2015.05); *Y02W 30/827* (2015.05); *Y02W 90/20* (2015.05); *Y04S 10/54* (2013.01); *Y10S 901/01* (2013.01)

(56) References Cited

U.S. PATENT DOCUMENTS

| | | |
|---|---|---|
| 3,765,546 A | 10/1973 | Westerling |
| 3,866,780 A | 2/1975 | Miller |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,771,840 A | 9/1988 | Keller |
| 4,777,416 A | 10/1988 | George |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,197 B1 | 5/2003 | Frank |
| 6,571,693 B1 | 6/2003 | Kaldenberg |
| 6,584,375 B2 | 6/2003 | Bancroft |
| 6,584,376 B1 | 6/2003 | VanKommer |
| 6,587,835 B1 | 7/2003 | Treyz |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |

(56) References Cited

U.S. PATENT DOCUMENTS

| | | | |
|---|---|---|---|
| 6,954,695 | B2 | 10/2005 | Bonilla |
| 6,967,455 | B2 | 11/2005 | Nakadai |
| 6,975,997 | B1 | 12/2005 | Murakami |
| 7,039,499 | B1 | 5/2006 | Nasr |
| 7,066,291 | B2 | 6/2006 | Martins |
| 7,101,113 | B2 | 9/2006 | Hughes |
| 7,101,139 | B1 | 9/2006 | Benedict |
| 7,117,902 | B2 | 10/2006 | Osborne |
| 7,145,562 | B2 | 12/2006 | Schechter |
| 7,147,154 | B2 | 12/2006 | Myers |
| 7,177,820 | B2 | 2/2007 | McIntyre |
| 7,184,586 | B2 | 2/2007 | Jeon |
| 7,205,016 | B2 | 4/2007 | Garwood |
| 7,206,753 | B2 | 4/2007 | Bancroft |
| 7,222,363 | B2 | 5/2007 | Rice |
| 7,233,241 | B2 | 6/2007 | Overhultz |
| 7,234,609 | B2 | 6/2007 | DeLazzer |
| 7,261,511 | B2 | 8/2007 | Felder |
| 7,367,245 | B2 | 5/2008 | Okazaki |
| 7,381,022 | B1 | 6/2008 | King |
| 7,402,018 | B2 | 7/2008 | Mountz |
| 7,431,208 | B2 | 10/2008 | Feldman |
| 7,447,564 | B2 | 11/2008 | Yasukawa |
| 7,463,147 | B1 | 12/2008 | Laffoon |
| 7,474,945 | B2 | 1/2009 | Matsunaga |
| 7,487,913 | B2 | 2/2009 | Adema |
| 7,533,029 | B2 | 5/2009 | Mallett |
| 7,554,282 | B2 | 6/2009 | Nakamoto |
| 7,556,108 | B2 | 7/2009 | Won |
| 7,556,219 | B2 | 7/2009 | Page |
| 7,587,756 | B2 | 9/2009 | Peart |
| 7,613,544 | B2 | 11/2009 | Park |
| 7,627,515 | B2 | 12/2009 | Borgs |
| 7,636,045 | B2 | 12/2009 | Sugiyama |
| 7,648,068 | B2 | 1/2010 | Silverbrook |
| 7,653,603 | B1 | 1/2010 | Holtkamp, Jr. |
| 7,658,327 | B2 | 2/2010 | Tuchman |
| 7,689,322 | B2 | 3/2010 | Tanaka |
| 7,693,605 | B2 | 4/2010 | Park |
| 7,693,745 | B1 | 4/2010 | Pomerantz |
| 7,693,757 | B2 | 4/2010 | Zimmerman |
| 7,706,917 | B1 | 4/2010 | Chiappetta |
| 7,716,064 | B2 | 5/2010 | McIntyre |
| 7,726,563 | B2 | 6/2010 | Scott |
| 7,762,458 | B2 | 7/2010 | Stawar |
| 7,783,527 | B2 | 8/2010 | Bonner |
| 7,787,985 | B2 | 8/2010 | Tsujimoto |
| 7,817,394 | B2 | 10/2010 | Mukherjee |
| 7,826,919 | B2 | 11/2010 | DAndrea |
| 7,835,281 | B2 | 11/2010 | Lee |
| 7,894,932 | B2 | 2/2011 | Mountz |
| 7,894,939 | B2 | 2/2011 | Zini |
| 7,957,837 | B2 | 6/2011 | Ziegler |
| 7,969,297 | B2 | 6/2011 | Haartsen |
| 7,996,109 | B2 | 8/2011 | Zini |
| 8,010,230 | B2 | 8/2011 | Zini |
| 8,032,249 | B1 | 10/2011 | Shakes |
| 8,041,455 | B2 | 10/2011 | Thorne |
| 8,050,976 | B2 | 11/2011 | Staib |
| 8,065,032 | B2 | 11/2011 | Stifter |
| 8,065,353 | B2 | 11/2011 | Eckhoff-Hornback |
| 8,069,092 | B2 | 11/2011 | Bryant |
| 8,083,013 | B2 | 12/2011 | Bewley |
| 8,099,191 | B2 | 1/2012 | Blanc |
| 8,103,398 | B2 | 1/2012 | Duggan |
| 8,195,333 | B2 | 6/2012 | Ziegler |
| 8,239,276 | B2 | 8/2012 | Lin |
| 8,244,041 | B1 | 8/2012 | Silver |
| 8,248,467 | B1 | 8/2012 | Ganick |
| 8,260,456 | B2 | 9/2012 | Siegel |
| 8,284,240 | B2 | 10/2012 | Saint-Pierre |
| 8,295,542 | B2 | 10/2012 | Albertson |
| 8,321,303 | B1 | 11/2012 | Krishnamurthy |
| 8,325,036 | B1 | 12/2012 | Fuhr |
| 8,342,467 | B2 | 1/2013 | Stachowski |
| 8,352,110 | B1 | 1/2013 | Szybalski |
| 8,359,122 | B2 | 1/2013 | Koselka |
| 8,380,349 | B1 | 2/2013 | Hickman |
| 8,393,846 | B1 | 3/2013 | Coots |
| 8,412,400 | B2 | 4/2013 | DAndrea |
| 8,423,280 | B2 | 4/2013 | Edwards |
| 8,425,173 | B2 | 4/2013 | Lert |
| 8,429,004 | B2 | 4/2013 | Hamilton |
| 8,430,192 | B2 | 4/2013 | Gillett |
| 8,433,470 | B1 | 4/2013 | Szybalski |
| 8,433,507 | B2 | 4/2013 | Hannah |
| 8,437,875 | B2 | 5/2013 | Hernandez |
| 8,444,369 | B2 | 5/2013 | Watt |
| 8,447,863 | B1 | 5/2013 | Francis, Jr. |
| 8,452,450 | B2 | 5/2013 | Dooley |
| 8,474,090 | B2 | 7/2013 | Jones |
| 8,494,908 | B2 | 7/2013 | Herwig |
| 8,504,202 | B2 | 8/2013 | Ichinose |
| 8,508,590 | B2 | 8/2013 | Laws |
| 8,510,033 | B2 | 8/2013 | Park |
| 8,511,606 | B1 | 8/2013 | Lutke |
| 8,515,580 | B2 | 8/2013 | Taylor |
| 8,516,651 | B2 | 8/2013 | Jones |
| 8,538,577 | B2 | 9/2013 | Bell |
| 8,544,858 | B2 | 10/2013 | Eberlein |
| 8,571,700 | B2 | 10/2013 | Keller |
| 8,572,712 | B2 | 10/2013 | Rice |
| 8,577,538 | B2 | 11/2013 | Lenser |
| 8,587,662 | B1 | 11/2013 | Moll |
| 8,588,969 | B2 | 11/2013 | Frazier |
| 8,594,834 | B1 | 11/2013 | Clark |
| 8,606,314 | B2 | 12/2013 | Barnes, Jr. |
| 8,606,392 | B2 | 12/2013 | Wurman |
| 8,639,382 | B1 | 1/2014 | Clark |
| 8,645,223 | B2 | 2/2014 | Ouimet |
| 8,649,557 | B2 | 2/2014 | Hyung |
| 8,656,550 | B2 | 2/2014 | Jones |
| 8,670,866 | B2 | 3/2014 | Ziegler |
| 8,671,507 | B2 | 3/2014 | Jones |
| 8,676,377 | B2 | 3/2014 | Siegel |
| 8,676,420 | B2 | 3/2014 | Kume |
| 8,676,480 | B2 | 3/2014 | Lynch |
| 8,700,230 | B1 | 4/2014 | Hannah |
| 8,708,285 | B1 | 4/2014 | Carreiro |
| 8,718,814 | B1 | 5/2014 | Clark |
| 8,724,282 | B2 | 5/2014 | Hiremath |
| 8,732,039 | B1 | 5/2014 | Chen |
| 8,744,626 | B2 | 6/2014 | Johnson |
| 8,751,042 | B2 | 6/2014 | Lee |
| 8,763,199 | B2 | 7/2014 | Jones |
| 8,770,976 | B2 | 7/2014 | Moser |
| 8,775,064 | B2 | 7/2014 | Zeng |
| 8,798,786 | B2 | 8/2014 | Wurman |
| 8,798,840 | B2 | 8/2014 | Fong |
| 8,814,039 | B2 | 8/2014 | Bishop |
| 8,818,556 | B2 | 8/2014 | Sanchez |
| 8,820,633 | B2 | 9/2014 | Bishop |
| 8,825,226 | B1 | 9/2014 | Worley, III |
| 8,831,984 | B2 | 9/2014 | Hoffman |
| 8,838,268 | B2 | 9/2014 | Friedman |
| 8,843,244 | B2 | 9/2014 | Phillips |
| 8,851,369 | B2 | 10/2014 | Bishop |
| 8,882,432 | B2 | 11/2014 | Bastian, II |
| 8,886,390 | B2 | 11/2014 | Wolfe |
| 8,892,240 | B1 | 11/2014 | Vliet |
| 8,892,241 | B2 | 11/2014 | Weiss |
| 8,899,903 | B1 | 12/2014 | Saad |
| 8,918,202 | B2 | 12/2014 | Kawano |
| 8,918,230 | B2 | 12/2014 | Chen |
| 8,930,044 | B1 | 1/2015 | Peeters |
| 8,965,561 | B2 | 2/2015 | Jacobus |
| 8,972,045 | B1 | 3/2015 | Mountz |
| 8,972,061 | B2 | 3/2015 | Rosenstein |
| 8,983,647 | B1 | 3/2015 | Dwarakanath |
| 8,989,053 | B1 | 3/2015 | Skaaksrud |
| 9,002,506 | B1 | 4/2015 | Agarwal |
| 9,008,827 | B1 | 4/2015 | Dwarakanath |
| 9,008,829 | B2 | 4/2015 | Worsley |
| 9,014,848 | B2 | 4/2015 | Farlow |

(56) References Cited

U.S. PATENT DOCUMENTS

| | | |
|---|---|---|
| 9,053,506 B2 | 6/2015 | Van Nest |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 1,506,095 A1 | 3/2016 | High |
| 1,506,102 A1 | 3/2016 | High |
| 1,506,105 A1 | 3/2016 | Kay |
| 1,506,120 A1 | 3/2016 | High |
| 1,506,126 A1 | 3/2016 | High |
| 1,506,128 A1 | 3/2016 | High |
| 1,506,132 A1 | 3/2016 | High |
| 1,506,135 A1 | 3/2016 | Thompson |
| 1,506,140 A1 | 3/2016 | High |
| 1,506,144 A1 | 3/2016 | High |
| 1,506,147 A1 | 3/2016 | High |
| 1,506,150 A1 | 3/2016 | High |
| 1,506,167 A1 | 3/2016 | High |
| 1,506,168 A1 | 3/2016 | High |
| 1,506,172 A1 | 3/2016 | High |
| 1,506,177 A1 | 3/2016 | Atchley |
| 1,506,179 A1 | 3/2016 | Winkle |
| 1,506,180 A1 | 3/2016 | High |
| 1,506,184 A1 | 3/2016 | High |
| 1,506,190 A1 | 3/2016 | High |
| 1,506,198 A1 | 3/2016 | Thompson |
| 9,278,839 B2 | 3/2016 | Gilbride |
| 9,305,280 B1 | 4/2016 | Berg |
| 9,329,597 B2 | 5/2016 | Stoschek |
| 1,527,500 A1 | 9/2016 | High |
| 1,527,501 A1 | 9/2016 | High |
| 1,527,504 A1 | 9/2016 | High |
| 1,528,295 A1 | 9/2016 | High |
| 1,528,892 A1 | 10/2016 | High |
| 9,494,936 B2 | 11/2016 | Kerzner |
| 9,495,703 B1 | 11/2016 | Kaye |
| 1,527,499 A1 | 1/2017 | High |
| 9,534,906 B2 | 1/2017 | High |
| 9,550,577 B1 | 1/2017 | Beckman |
| 1,542,381 A1 | 2/2017 | High |
| 9,573,684 B2 | 2/2017 | Kimchi |
| 9,578,282 B1 | 2/2017 | Sills |
| 1,544,691 A1 | 3/2017 | High |
| 1,544,717 A1 | 3/2017 | High |
| 1,544,720 A1 | 3/2017 | High |
| 1,547,127 A1 | 3/2017 | High |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 9,747,480 B2 | 8/2017 | McAllister |
| 1,569,806 A1 | 9/2017 | High |
| 9,757,002 B2 | 9/2017 | Thompson |
| 9,785,911 B2 | 10/2017 | Galluzzo |
| 9,796,093 B2 | 10/2017 | Mascorro Medina |
| 9,801,517 B2 | 10/2017 | High |
| 9,827,678 B1 | 11/2017 | Gilbertson |
| 1,583,670 A1 | 12/2017 | High |
| 9,875,502 B2 | 1/2018 | Kay |
| 9,875,503 B2 | 1/2018 | High |
| 1,589,225 A1 | 2/2018 | High |
| 1,589,415 A1 | 2/2018 | High |
| 9,896,315 B2 | 3/2018 | High |
| 9,908,760 B2 | 3/2018 | High |
| 9,948,917 B2 | 4/2018 | Inacio De Matos |
| 1,599,027 A1 | 5/2018 | High |
| 1,600,177 A1 | 6/2018 | High |
| 9,994,434 B2 | 6/2018 | High |
| 1,001,732 A1 | 7/2018 | High |
| 1,605,943 A1 | 8/2018 | High |
| 1,610,006 A1 | 8/2018 | High |
| 1,610,929 A1 | 8/2018 | High |
| 1,007,189 A1 | 9/2018 | High |
| 1,008,152 A1 | 9/2018 | High |
| 1,013,023 A1 | 11/2018 | Atchley |
| 1,013,810 A1 | 11/2018 | Thompson |
| 1,619,119 A1 | 11/2018 | Thompson |
| 1,014,706 A1 | 12/2018 | Galluzzo |
| 1,621,614 A1 | 12/2018 | High |
| 1,622,453 A1 | 12/2018 | High |
| 1,018,969 A1 | 1/2019 | High |
| 1,626,926 A1 | 2/2019 | High |
| 1,628,288 A1 | 2/2019 | McHale |
| 1,023,973 A1 | 3/2019 | High |
| 1,636,101 A1 | 3/2019 | High |
| 1,639,985 A1 | 4/2019 | High |
| 1,028,005 A1 | 5/2019 | High |
| 1,640,833 A1 | 5/2019 | Atchley |
| 1,643,481 A1 | 6/2019 | High |
| 1,644,213 A1 | 6/2019 | High |
| 2001/0042024 A1 | 11/2001 | Rogers |
| 2002/0060542 A1 | 5/2002 | Song |
| 2002/0084323 A1 | 7/2002 | Benyak |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0203633 A1 | 10/2004 | Knauerhase |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0086051 A1 | 4/2005 | Brulle-Drews |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2005/0267826 A1 | 12/2005 | Levy |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0210382 A1 | 9/2006 | Mountz |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |

(56) References Cited

U.S. PATENT DOCUMENTS

| | | |
|---|---|---|
| 2007/0045018 A1 | 3/2007 | Carter |
| 2007/0061210 A1 | 3/2007 | Chen |
| 2007/0069014 A1 | 3/2007 | Heckel |
| 2007/0072662 A1 | 3/2007 | Templeman |
| 2007/0085682 A1 | 4/2007 | Murofushi |
| 2007/0112461 A1 | 5/2007 | Zini |
| 2007/0125727 A1 | 6/2007 | Winkler |
| 2007/0150368 A1 | 6/2007 | Arora |
| 2007/0152057 A1 | 7/2007 | Cato |
| 2007/0222679 A1 | 9/2007 | Morris |
| 2007/0269299 A1 | 11/2007 | Ross |
| 2007/0284442 A1 | 12/2007 | Herskovitz |
| 2007/0288123 A1 | 12/2007 | D Andrea |
| 2007/0288127 A1 | 12/2007 | Haq |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |
| 2008/0042836 A1 | 2/2008 | Christopher |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0228600 A1 | 9/2008 | Treyz |
| 2008/0243301 A1 | 10/2008 | Lanigan |
| 2008/0267759 A1 | 10/2008 | Morency |
| 2008/0281515 A1 | 11/2008 | Ann |
| 2008/0281664 A1 | 11/2008 | Campbell |
| 2008/0292439 A1 | 11/2008 | Dunkel |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0177323 A1 | 7/2009 | Ziegler |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0131103 A1 | 5/2010 | Herzog |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0262278 A1 | 10/2010 | Winkler |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0316470 A1 | 12/2010 | Lert |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0238211 A1 | 9/2011 | Shirado |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288682 A1 | 11/2011 | Pinter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0166241 A1 | 6/2012 | Livingston |
| 2012/0185094 A1 | 7/2012 | Rosenstein |
| 2012/0185355 A1 | 7/2012 | Kilroy |
| 2012/0192260 A1 | 7/2012 | Kontsevich |
| 2012/0197431 A1 | 8/2012 | Toebes |
| 2012/0203661 A1 | 8/2012 | Baharloo |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0080289 A1 | 3/2013 | Roy |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0144595 A1 | 6/2013 | Lord |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0173049 A1 | 7/2013 | Brunner |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0231779 A1 | 9/2013 | Purkayastha |
| 2013/0235206 A1 | 9/2013 | Smith |
| 2013/0238130 A1 | 9/2013 | Dorschel |
| 2013/0245810 A1 | 9/2013 | Sullivan |
| 2013/0254304 A1 | 9/2013 | Van Ness |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |

(56) References Cited

U.S. PATENT DOCUMENTS

| | | |
|---|---|---|
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0136414 A1 | 5/2014 | Abhyanker |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0258854 A1 | 9/2014 | Li |
| 2014/0266616 A1 | 9/2014 | Jones |
| 2014/0267409 A1 | 9/2014 | Fein |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344011 A1 | 11/2014 | Dogin |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0088310 A1 | 3/2015 | Pinter |
| 2015/0088703 A1 | 3/2015 | Yan |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2015/0379468 A1 | 12/2015 | Harvey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1 | 4/2016 | Mascorro Medina |
| 2016/0158635 A1 | 6/2016 | Aders |
| 2016/0165988 A1 | 6/2016 | Glasgow |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0288687 A1 | 10/2016 | Scherle |
| 2016/0297610 A1* | 10/2016 | Grosse .............. B60M 1/34 |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364732 A1 | 12/2016 | Jagatheesan |

(56) References Cited

U.S. PATENT DOCUMENTS

| | | | |
|---|---|---|---|
| 2016/0364785 A1 | 12/2016 | Wankhede | |
| 2016/0364786 A1 | 12/2016 | Wankhede | |
| 2017/0009417 A1 | 1/2017 | High | |
| 2017/0010608 A1 | 1/2017 | High | |
| 2017/0010609 A1 | 1/2017 | High | |
| 2017/0010610 A1 | 1/2017 | Atchley | |
| 2017/0020354 A1 | 1/2017 | High | |
| 2017/0024806 A1 | 1/2017 | High | |
| 2017/0079202 A1* | 3/2017 | Balutis | B25J 9/0081 |
| 2017/0080846 A1 | 3/2017 | Lord | |
| 2017/0101120 A1* | 4/2017 | Hannah | B62B 5/0033 |
| 2017/0107055 A1 | 4/2017 | Magens | |
| 2017/0110017 A1 | 4/2017 | Kimchi | |
| 2017/0120443 A1 | 5/2017 | Kang | |
| 2017/0129602 A1 | 5/2017 | Alduaiji | |
| 2017/0137235 A1 | 5/2017 | Thompson | |
| 2017/0148075 A1 | 5/2017 | High | |
| 2017/0158430 A1 | 6/2017 | Raizer | |
| 2017/0166399 A1 | 6/2017 | Stubbs | |
| 2017/0176986 A1 | 6/2017 | High | |
| 2017/0178066 A1 | 6/2017 | High | |
| 2017/0178082 A1 | 6/2017 | High | |
| 2017/0183159 A1 | 6/2017 | Weiss | |
| 2017/0283171 A1 | 10/2017 | High | |
| 2017/0300759 A1* | 10/2017 | Beard | G06K 9/00771 |
| 2017/0318446 A1 | 11/2017 | Lee | |
| 2017/0355081 A1 | 12/2017 | Fisher | |
| 2018/0009108 A1 | 1/2018 | Yamamoto | |
| 2018/0020896 A1 | 1/2018 | High | |
| 2018/0068357 A1 | 3/2018 | High | |
| 2018/0075403 A1 | 3/2018 | Mascorro Medina | |
| 2018/0099846 A1 | 4/2018 | High | |
| 2018/0170729 A1 | 6/2018 | High | |
| 2018/0170730 A1 | 6/2018 | High | |
| 2018/0273292 A1 | 9/2018 | High | |
| 2018/0282139 A1 | 10/2018 | High | |
| 2018/0346299 A1 | 12/2018 | High | |
| 2018/0346300 A1 | 12/2018 | High | |
| 2019/0002256 A1 | 1/2019 | High | |
| 2019/0084814 A1 | 3/2019 | Thompson | |
| 2019/0112171 A1 | 4/2019 | High | |
| 2019/0119083 A1 | 4/2019 | High | |
| 2019/0169005 A1 | 6/2019 | High | |
| 2019/0185302 A1 | 6/2019 | McHale | |
| 2019/0210849 A1 | 7/2019 | High | |
| 2019/0256334 A1 | 8/2019 | High | |
| 2019/0263644 A1 | 8/2019 | Atchley | |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

Ang, Fitzwatler, et al.; "Automated Waste Sorter With Mobile Robot Delivery Waste System", De La Salle University Research Congress 2013, Mar. 7-9, 2013, pp. 1-7.

Ansari, Sameer, et al.; "Automated Trash Collection & Removal in Office Cubicle Environments", Squad Collaborative Robots, Sep. 27, 2013, pp. 1-23.

(56) References Cited

OTHER PUBLICATIONS

Armstrong, Jean, et al.; "Visible Light Positioning: A Roadmap for International Standardization", IEEE Communications Magazine, Dec. 2013, pp. 2-7.

Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.

Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.

Avezbadalov, Ariel, et al.; "Snow Shoveling Robot", engineering.nyu.edu/mechatronics/projects/ME3484/2006/Snow Shoveling Robot/Mechatronics Snow Robot Presentation Update Dec. 19, 2006.pdf, 2006, pp. 1-24.

Bares, John, et al.; "Designing Crash-Survivable Unmanned Vehicles", AUVSI Symposium, Jul. 10, 2002, pp. 1-15.

Bohren; Jonathan et al.; "Towards Autonomous Robotic Butlers: Lessons Learned with the PR2", Willow Garage, May 9, 2011, pp. 1-8.

Bohren; Jonathan et al.; "Towards Autonomous Robotic Butlers: Lessons Learned with the PR2", Willow Garage, pp. 1-8.

Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.

Burns, Tom; "irobot roomba 780 review best robot vacuum floor cleaning robot review video demo", https://www.youtube.com/watch?v=MkwtlyVAaEY, published on Feb. 13, 2013, pp. 1-10.

Bytelight; "Scalable Indoor Location", http://www.bytelight.com/, Dec. 12, 2014, pp. 1-2.

Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.

Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.

Carnegie Mellon Univeristy; "AndyVision—The Future of Retail", https://www.youtube.com/watch?v=n5309ILTV2s, published on Jul. 16, 2012, pp. 1-9.

Carnegie Mellon University; "Robots in Retail", www.cmu.edu/homepage/computing/2012/summer/robots-in-retail.shmtl, 2012, pp. 1.

Chopade, Jayesh, et al.; "Control of Spy Robot by Voice and Computer Commands", International Journal of Advanced Research in Computer and Communication Engineering, vol. 2, Issue 4, Apr. 2013, pp. 1-3.

CNET; "iRobot Braava 380t—No standing ovation for this robotic floor mop", https://www.youtube.com/watch?v=JAtClxFtC6Q, published on May 7, 2014, pp. 1-6.

Coltin, Brian & Ventura, Rodrigo; "Dynamic User Task Scheduling for Mobile Robots", Association for the Advancement of Artificial Intelligence, 2011, pp. 1-6.

Couceiro, Micael S., et al.; "Marsupial teams of robots: deployment of miniature robots for swarm exploration under communication constraints", Robotica, Cambridge University Press, downloaded Jan. 14, 2014, pp. 1-22.

Coxworth, Ben; "Robot designed to sort trash for recycling", Gizmag, http://www.gizmag.com/robot-sorts-trash-for-recycling/18426/, Apr. 18, 2011, pp. 1-7.

Davis, Jo; "The Future of Retail: In Store Now", Online Brands, http://onlinebrands.co.nz/587/future-retail-store-now/, Nov. 16, 2014, pp. 1-5.

Denso; "X-mobility", Oct. 10, 2014, pp. 1-2, including machine translation.

DHL; "Self-Driving Vehicles in Logistics: A DHL perspective on implications and use cases for the logistics industry", 2014, pp. 1-39.

Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.

Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.

Dyson US; "See the new Dyson 360 Eye robot vacuum cleaner in action #DysonRobot", https://www.youtube.com/watch?v=OadhuICDAjk, published on Sep. 4, 2014, pp. 1-7.

Edwards, Lin; "Supermarket robot to help the elderly (w/Video)", Phys.Org, http://phys.org/news/2009-12-supermarket-robot-elderly-video.html, Dec. 17, 2009, pp. 1-5.

Elfes, Alberto; "Using Occupancy Grids for Mobile Robot Perception and Navigation", IEEE, 1989, pp. 46-57.

Elkins, Herschel T.; "Important 2014 New Consumer Laws", County of Los Angeles Department of Consumer Affairs Community Outreach & Education, updated Jan. 6, 2014, pp. 1-46.

Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.

Falconer, Jason; "Toyota unveils helpful Human Support Robot", Gizmag, http:/www.gizmag.com/toyota-human-support-robot/24246/, Sep. 22, 2012, pp. 1-6.

Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.

Fellow Robots; "Meet OSHBOT", http://fellowrobots.com/oshbot/, May 19, 2015, pp. 1-3.

Fellowrobots; "Oshbot Progress—Fellow Robots", https://vimeo.com/139532370, published Sep. 16, 2015, pp. 1-5.

FORA.TV; "A Day in the Life of a Kiva Robot", https://www.youtube.com/watch?v=6KRjuuEVEZs, published on May 11, 2011, pp. 1-11.

GAMMA2VIDEO; "FridayBeerBot.wmv", https://www.youtube.com/watch? v=KXXIIDYatxQ, published on Apr. 27, 2010, pp. 1-7.

Glas, Dylan F., et al.; "The Network Robot System: Enabling Social Human-Robot Interaction in Public Spaces", Journal of Human-Robot Interaction, vol. 1, No. 2, 2012, pp. 5-32.

Green, A., et al; "Report on evaluation of the robot trolley", CommRob IST-045441, Advanced Behaviour and High-Level Multimodal Communications with and among Robots, Jun. 14, 2010, pp. 10-67.

Gross, H.-M., et al.; Toomas: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.

Habib, Maki K., "Real Time Mapping and Dynamic Navigation for Mobile Robots", International Journal of Advanced Robotic Systems, vol. 4, No. 3, 2007, pp. 323-338.

HRJ3 Productions; "Japanese Automatic Golf Cart", https://www.youtube.com/watch?v=8diWYtqb6C0, published on Mar. 29, 2014, pp. 1-4.

Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.

IEEE Spectrum; "Warehouse Robots at Work", https://www.youtube.com/watch? v=IWsMdN7HMuA, published on Jul. 21, 2008, pp. 1-11.

Intelligent Autonomous Systems; "TUM James goes shopping", https://www.youtube.com/watch?v=JS2zycc4AUE, published on May 23, 2011, pp. 1-13.

Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.

Kehoe, Ben, et al.; "Cloud-Based Robot Grasping with the Google Object Recognition Engine", 2013, pp. 1-7.

(56) References Cited

OTHER PUBLICATIONS

Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
KIVA Systems; "Automated Goods-to-Man Order Picking System—Kiva Systems", http://www.kivasystems.com/solutions/picking/, printed on Apr. 2, 2015, pp. 1-2.
KIVA Systems; "Frequently Asked Questions about Kiva Systems—Kiva Systems", http://kivasystems.com/about-us-the-kiva-approach/faq/, printed on Apr. 2, 2015, pp. 1-2.
KIVA Systems; "how a Kiva system makes use of the vertical space—Kiva Systems", http://www.kivasystems.com/solutions/vertical-storage/, printed on Apr. 2, 2015, pp. 1-2.
KIVA Systems; "How Kiva Systems and Warehouse Management Systems Interact", 2010, pp. 1-12.
KIVA Systems; "Kiva replenishment is more productive and accurate than replenishing pick faces in traditional distribution operations", http//www.kivasystems.com/solutions/replenishment/, printed on Apr. 2, 2015, pp. 1-2.
KIVA Systems; "Kiva warehouse control software, Kiva WCS—Kiva Systems", http://www.kivasystems.com/solutions/software/, printed on Apr. 2, 2015, pp. 1-2.
KIVA Systems; "Kiva's warehouse automation system is the most powerful and flexible A . . . ", http://www.kivasystems.com/solutions/, printed on Apr. 2, 2015, pp. 1-2.
KIVA Systems; "Shipping Sortation—Kiva Systems", http://www.kivasystems.com/solutions/shipping-sortation/, printed on Apr. 2, 2015, pp. 1-2.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 280-288.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.

Meena, M., & Thilagavathi, P.; "Automatic Docking System with Recharging and Battery Replacement for Surveillance Robot", International Journal of Electronics and Computer Science Engineering, 2012, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
NEUROBTV; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 14-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=o6HYwYIo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the New Stewart Golf X9 Follow", https://www.youtube.com/watch?v=HHivFGtiuE, published on Apr. 9, 2014, pp. 1-9.
Sun, Eric; ""Smart Bin & Trash Route" system—RMIT 2012 Green Inventors Competition", http://www.youtube.com/watch?v=OrTA57aIO0k, published on Nov. 14, 2012, pp. 1-8.

(56) References Cited

OTHER PUBLICATIONS

Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", Apr. 18, 2005, pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses—The Window-WIRED", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_SOKc, published on Jul. 12, 2012, pp. 1-7.
Budgee; "The Robotic Shopping Cart Budgee "; https://www.youtube.com/watch?v=2dYNdVPF4VM; published on Mar. 20, 2015; pp. 1-6.
Daily Mail; "Dancing with your phone: the gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Follow Inspiration; "wiiGO"; https://www.youtube.com/watch?v=dhHXIdpknC4; published on Jun. 16, 2015; pp. 1-7.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
Technion; "Autonomous Tracking Shopping Cart—Shopping Made Easy from Technion"; https://www.youtube.com/watch?v=pQcb9fofmXg; published on Nov. 23, 2014; pp. 1-10.
USPTO; U.S. Appl. No. 15/061,325; Notice of Allowance dated Aug. 18, 2017.
USPTO; U.S. Appl. No. 15/061,325; Notice of Allowance dated May 15, 2017.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Onozato, Taishi et al.; "A Control System for the Robot Shopping Cart"; 2010 IRAST International Congress on Computer Applications and Computational Science (CACS 2010); 2010; pp. 907-910.
SK Telecom Co.; "SK Telecom Launches Smart Cart Pilot Test in Korea"; http://www.sktelecom.com/en/press/press_detail.do?idx=971; Oct. 4, 2011; pp. 1-2.
Tam, Donna; "Meet Amazon's busiest employee—the Kiva robot"; http://www.cnet.com/news/meet-amazons-busiest-employee-the-kiva-robot/; Nov. 30, 2014; pp. 1-6.
Emspak, Jesse; "Electric Trucks Plus Drones Could Make Deliveries 'Green'"; https://www.livescience.com/48510-delivery-drones-electric-trucks.html; Oct. 29, 2014; pp. 1-5.
Shandrow, Kim Lachance; "This shopping cart of the future creepily follows you around stores"; https://www.entrepreneur.com/article/241335; Dec. 31, 2014; pp. 1-13.
Workhorse Group; "HorseFly by Workhorse—Drone Delivery Concept"; https://www.youtube.com/watch?v=epqZ-luhzKQ; published on Oct. 13, 2015; pp. 1-8.
Workhorse; "HorseFly"; http://workhorse.com/aerospace; Feb. 2017; pp. 1-6.
Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; published Dec. 9, 2015; pp. 1-3.

* cited by examiner

SHOPPING FACILITY ASSISTANCE OBJECT DETECTION SYSTEMS, DEVICES AND METHODS

RELATED APPLICATIONS

This application is a continuation of U.S. application Ser. No. 15/061,325, filed Mar. 4, 2016, which is incorporated herein by reference in its entirety and which claims the benefit of each of the following U.S. Provisional applications, each of which is incorporated herein by reference in its entirety: U.S. Provisional Application No. 62/129,726, filed Mar. 6, 2015, U.S. Provisional Application No. 62/129,727, filed Mar. 6, 2015, U.S. Provisional Application No. 62/138,877, filed Mar. 26, 2015, U.S. Provisional Application No. 62/138,885, filed Mar. 26, 2015, U.S. Provisional Application No. 62/152,421, filed Apr. 24, 2015, U.S. Provisional Application No. 62/152,465, filed Apr. 24, 2015, U.S. Provisional Application No. 62/152,440, filed Apr. 24, 2015, U.S. Provisional Application No. 62/152,630, filed Apr. 24, 2015, U.S. Provisional Application No. 62/152,711, filed Apr. 24, 2015, U.S. Provisional Application No. 62/152,610, filed Apr. 24, 2015, U.S. Provisional Application No. 62/152,667, filed Apr. 24, 2015, U.S. Provisional Application No. 62/157,388, filed May 5, 2015, U.S. Provisional Application No. 62/165,579, filed May 22, 2015, U.S. Provisional Application No. 62/165,416, filed May 22, 2015, U.S. Provisional Application No. 62/165,586, filed May 22, 2015, U.S. Provisional Application No. 62/171,822, filed Jun. 5, 2015, U.S. Provisional Application No. 62/175,182, filed Jun. 12, 2015, U.S. Provisional Application No. 62/182,339, filed Jun. 19, 2015, U.S. Provisional Application No. 62/185,478, filed Jun. 26, 2015, U.S. Provisional Application No. 62/194,131, filed Jul. 17, 2015, U.S. Provisional Application No. 62/194,119, filed Jul. 17, 2015, U.S. Provisional Application No. 62/194,121, filed Jul. 17, 2015, U.S. Provisional Application No. 62/194,127, filed Jul. 17, 2015, U.S. Provisional Application No. 62/202,744, filed Aug. 7, 2015, U.S. Provisional Application No. 62/202,747, filed Aug. 7, 2015, U.S. Provisional Application No. 62/205,548, filed Aug. 14, 2015, U.S. Provisional Application No. 62/205,569, filed Aug. 14, 2015, U.S. Provisional Application No. 62/205,555, filed Aug. 14, 2015, U.S. Provisional Application No. 62/205,539, filed Aug. 14, 2015, U.S. Provisional Application No. 62/207,858, filed Aug. 20, 2015, U.S. Provisional Application No. 62/214,826, filed Sep. 4, 2015, U.S. Provisional Application No. 62/214,824, filed Sep. 4, 2015, U.S. Provisional Application No. 62/292,084, filed Feb. 5, 2016, U.S. Provisional Application No. 62/302,547, filed Mar. 2, 2016, U.S. Provisional Application No. 62/302,567, filed Mar. 2, 2016, U.S. Provisional Application No. 62/302,713, filed Mar. 2, 2016,and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
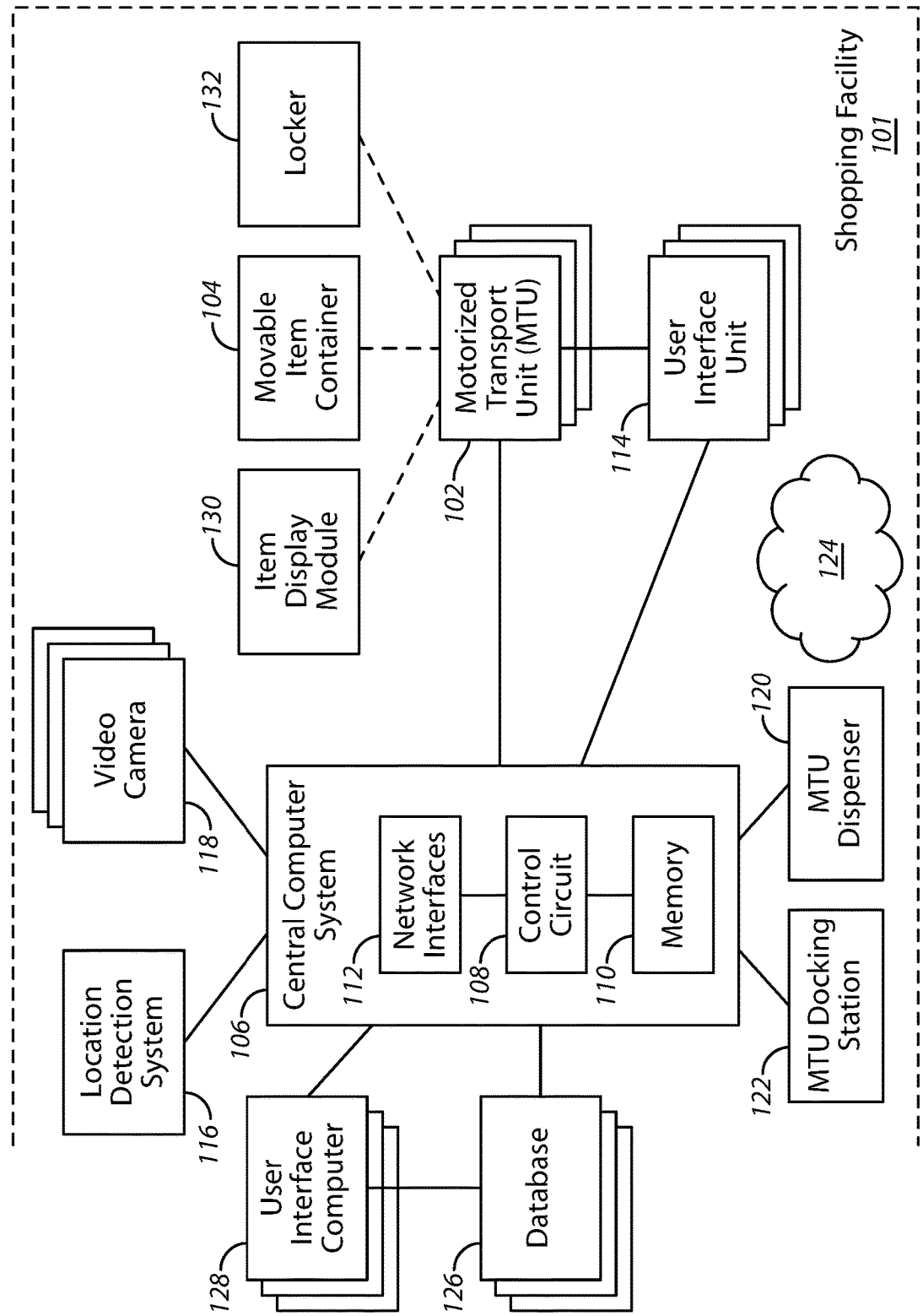
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations (i.e., point of sale (POS) locations), customer service areas other than checkout locations (such as service areas to handle returns), parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the sales floor area may include product storage units, shelves, racks, modules, bins, etc., and other walls, dividers, partitions, etc. that may be configured in different layouts or physical arrangements. In other examples, persons or other movable objects may be freely and independently traveling through the shopping facility space. And in another example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-11 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
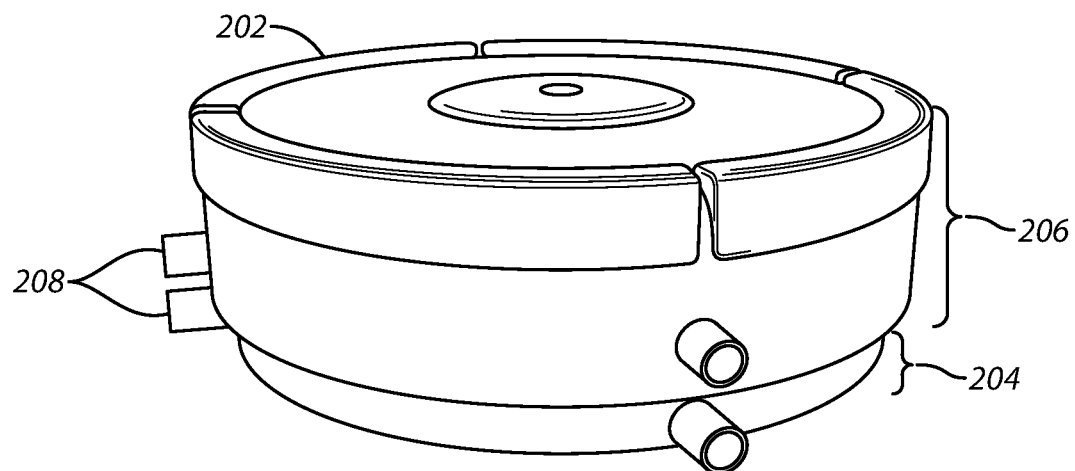
FIGS. 2A and 2B are illustrations of a motorized transport unit of the system of FIG. 1 in a retracted orientation and an extended orientation in accordance with some embodiments.
Figure 2B:
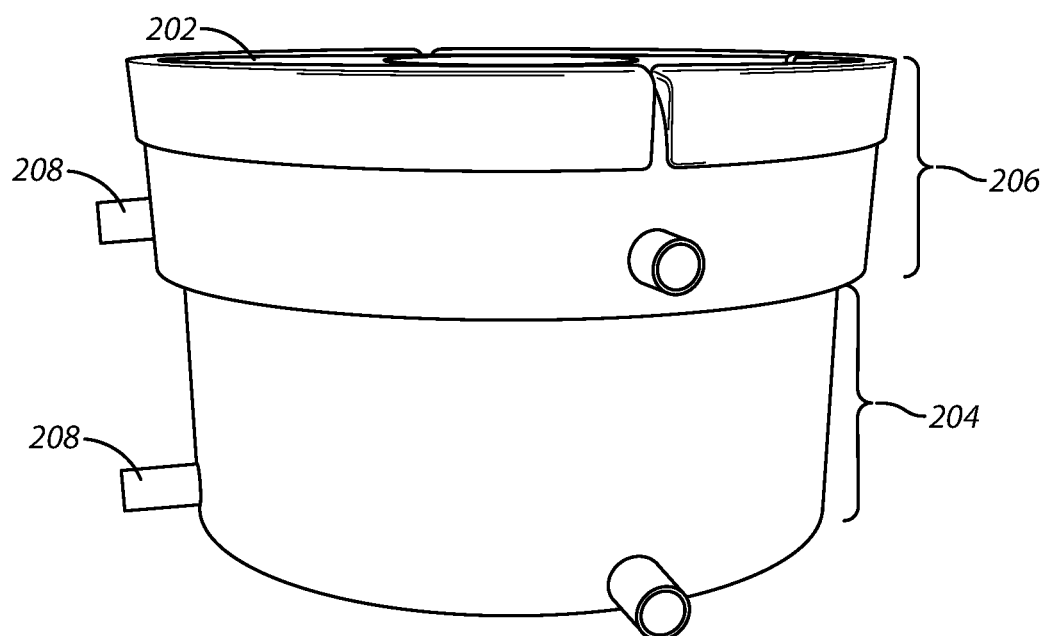

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
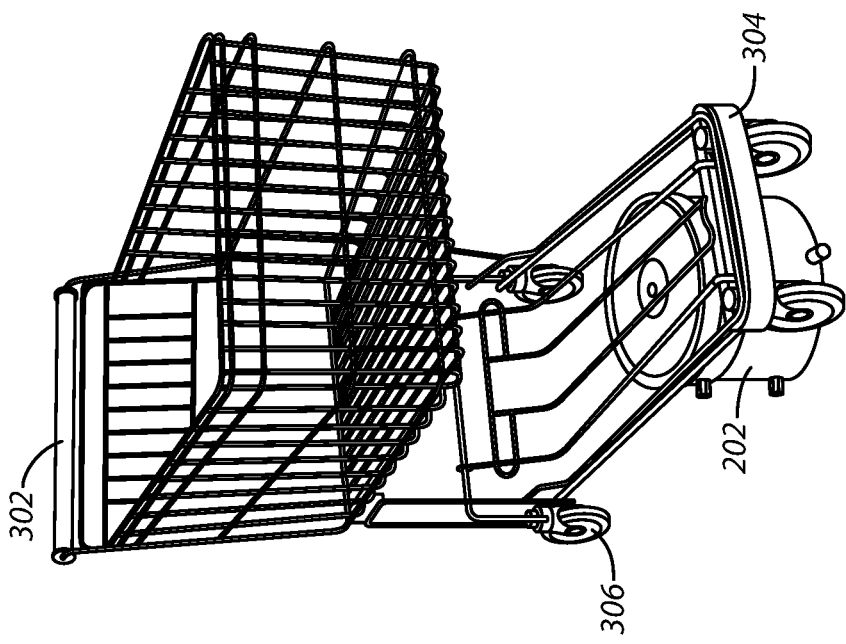
FIGS. 3A and 3B are illustrations of the motorized transport unit of FIGS. 2A and 2B detachably coupling to a movable item container, such as a shopping cart, in accordance with some embodiments.
Figure 3A:
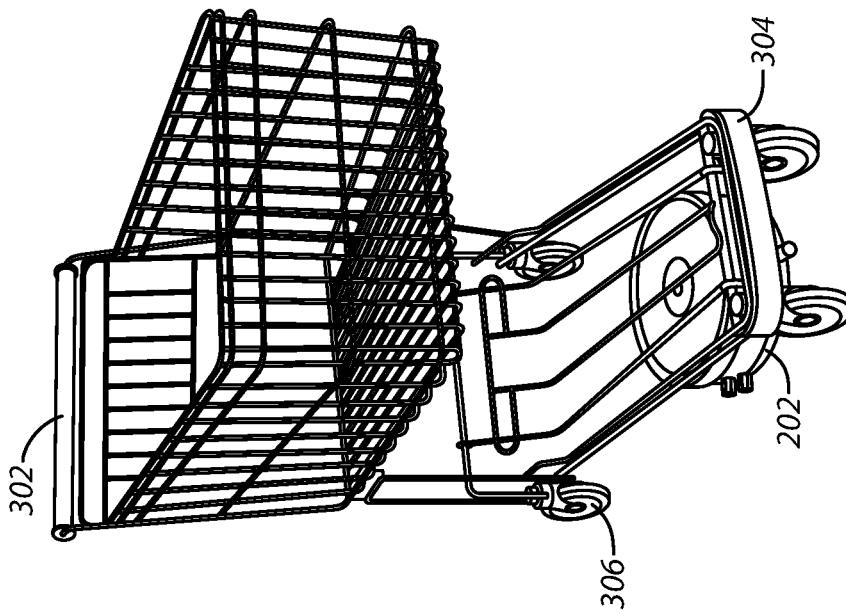

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
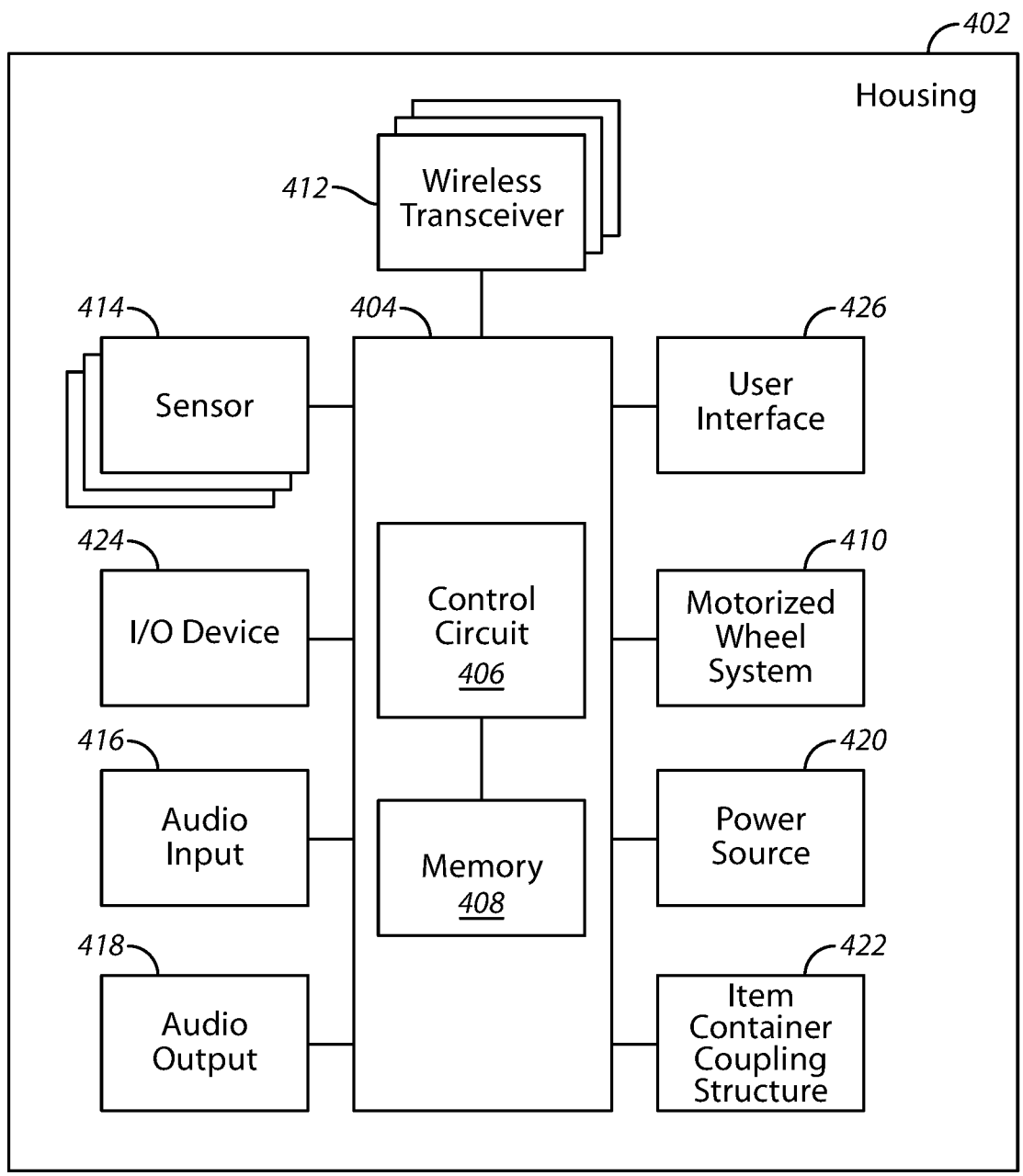
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
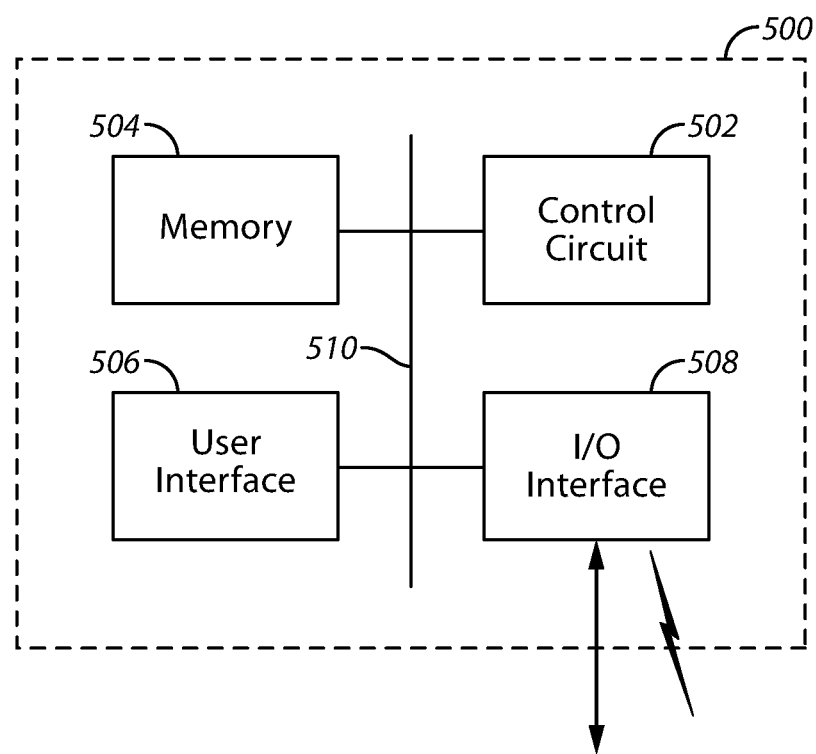
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features. The shopping assistance system comprises the multiple motorized transport units in implementing a system configured to carrying out various tasks, utilizing a motorized transport unit individually, in conjunction with another motorized transport unit, in concert with third party and/or remote control, and other such implementations. As described above, some of the tasks or actions performed by the motorized transport units include but are not limited to attaching to a mobile apparatus such as a movable item container 104, or other specialized mobile carts or the like, pulling it on a path and dropping or disconnecting from it when it arrives at its destination, or otherwise has completed its task. In some implementations, the central computer system identifies an available motorized transport unit that is nearest the task and configured to implement the task. As such, the central computer system can assign the task or tasks for which a motorized transport unit is best suited, based on its proximity and/or capability for the task. In some embodiments, multiple motorized transport units are stationed throughout the shopping facility, waiting for instructions to implement a task (e.g., cooperating with a movable item container, retrieving a low power motorized transport unit, guiding a customer, providing a communication portal, roaming an assigned area and attempting to locate tasks or issue that should be resolved.

Further, in some embodiments, the central computer system 106 is configured to detect objects that may affect the routes of travel of one or more motorized transport units 102. Based on the detected object and/or how it may affect the route of travel, one or more instructions can be issued to one or more motorized transport units to take one or more actions with regard to the detected object. Typically, the central computer system receives route condition information, which may have an effect on the route a motorized transport unit travels, from the motorized transport units, and other sources external to the motorized transport units. The route condition information can include, but is not limited to, sensor information from sensors 414 of one or more motorized transport units (e.g., distance sensor information, location sensor information, machine readable code information, motion sensor information, distance traveled information, image and/or video information from one or more cameras, and other such information), sensor information from other units or devices (e.g., sensor information from another motorized transport unit, a movable item container 104, one or more user interface units 114, docking and/or recharge stations 122, motorized transport dispensers 120, and the like), and/or sensor information from one or more sensor units of the shopping facility (e.g., cameras 118, distance sensors, location detection system 116, wireless network access points, and the like). The central computer system is configured to utilize the route condition information in determining whether an action is to be taken and what actions are to be taken by a motorized transport unit.

In some embodiments, some of the sensor data may be considered as an interrupt and/or may cause an interrupt of the movement of a motorized transport unit. Further, the sensor information and/or the route condition information is used to keep the motorized transport unit traveling along an intended route. However, when an object is detected, the central computer system identify actions to be taken relative to the object, and issues one or more commands to cause the motorized transport unit to implement the identified actions.

Figure 6:
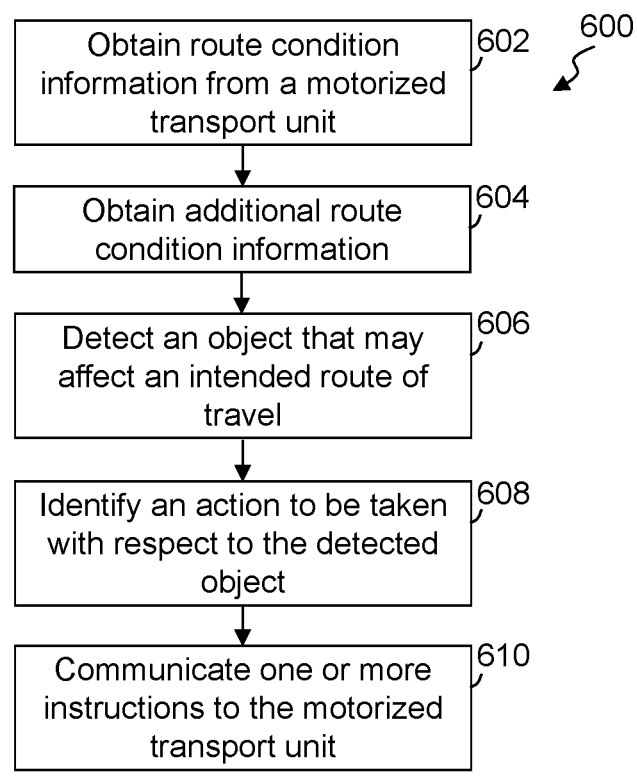
FIG. 6 illustrates a simplified flow diagram of an exemplary process of controlling movement of one or more motorized transport units, in accordance with some embodiments.

FIG. 6 illustrates a simplified flow diagram of an exemplary process 600 of controlling movement of one or more motorized transport units, in accordance with some embodiments. In step 602, route condition information is obtained from one or more communications received from one or more motorized transport units. Again, the route condition information can be acquired by the motorized transport unit through one or more sensors, cameras, and the like. The route condition information comprises information corresponding to and/or affecting an intended route of travel by a motorized transport unit. For example, the route condition information may comprise a distance measured by a distance sensor indicating an object is on the intended route, an image and/or content from a camera may show that an object has moved away from the intended route, pull or load sensor information may indicate that a force needed to move along the intended route is at or approaching a threshold, a bump sensor provides information that the motorized transport unit (or a device being moved by the motorized transport unit) has contacted an object, motion sensor information may provide information about an object approaching an intended route or moving away from an intended route, location information, trailing object sensor information, a command received from a customer or shopping facility worker, other such information, and typically a combination of two or more of such information.

In step 604, the central computer system obtains route condition information existing at the shopping facility and detected by one or more detectors external to a motorized transport unit. As introduced above, this additional route condition information may include, but is not limited to, sensor information from one or more other motorized transport units, sensor information from one or more user interface units, sensor information from one or more sensors of the shopping facility, and other such information. For example, one or more images and/or video content may be obtained, such as from shopping facility cameras 118 positioned at the shopping facility and remote from the motorized transport unit, camera of a user interface unit, or other such cameras. Other sensor information obtained from sensors separate to a particular motorized transport unit may additionally or alternatively be received and/or considered such as, but is not limited to, motion sensors, location sensor information, tag information (e.g. RFID tag identifiers), video content, and other such information.

In step 606, an object is detect, in response to an evaluation of both the route condition information from the motorized transport unit of interest and additional route condition information from one or more sources external to the motorized transport unit of interest, that may affect the intended route of travel of the motorized transport unit. In some instances, the detected object may be an object with which the motorized transport unit is intended to intercept, interact with, follow or the like. For example, the object may be a customer that is currently associated with the motorized transport unit such that the motorized transport unit is moving a movable item container of the customer; the object may be a customer and the motorized transport unit may be transporting a storage locker 132 that is intended for the customer; the object may be a customer with which the motorized transport unit is attempting to stay within a threshold distance of; the object may be a movable item container with which that the motorized transport unit is to couple; the object may be another motorized transport unit that the motorized transport unit is to engage (e.g., the other motorized transport unit may be low or out of power); and the like. In other instances, the object may be something that the motorized transport unit is to wait for and/or to move around. The object may be substantially any object that may affect the intended route of travel of the motorized transport unit. Further, in some embodiments, the object may be identified. The identification may be based on image and/or video processing at the central computer system or image processor in communication with the central computer system, based on a three-dimensional scan, based on facial recognition, based on general geometry, based on a detected machine readable code, and the like.

In step 608, an action or actions are identified that are to be taken by the motorized transport unit with respect to the detected object and in response to detecting the object. In some embodiments, the action is identified by the central computer system without user and/or customer interaction. The action is typically dependent on the object detected. In step 610, one or more instructions are communicated to one or more of the motorized transport units. The one or more instructions are configured to cause the motorized transport unit to implement the action based on the detected object.

The determined one or more actions to be performed can be substantially any relevant action such as, but not limited to, changing a route and/or direction of travel to avoid the object and/or move around the object, slowing or stopping and waiting, requesting that a customer or worker move, issue an audible alert or other audible output (e.g., apology, a spoken "excuse me", etc.), inquiring whether a customer needs assistance, cooperating with another motorized transport unit, following a customer associated with the motorized transport unit, approach a customer, interact with a customer, approach an object, attempt to move an obstruction, and other such actions or combinations of actions. For example, the central computer system may identify the object as a customer currently associated with the motorized transport unit, and the central computer system can, in identifying the action to be taken, determine that one or more route modifications are to be implemented to move the motorized transport unit to approach, follow and/or interact with the customer. As another example, the instructions may direct the motorized transport unit to move around a detected object. In some instances, more precision movement instructions may be given (e.g., through the use of a higher precision grid and/or mapping of the shopping facility) when the instructions are configured to cause the motorized transport unit to deviate from routes typically traveled by the motorized transport units and/or when moving along unexpected routes.

In some embodiments, the route condition information received from the motorized transport unit 102 of interest and/or other route condition information received from other sources external to the motorized transport unit of interest can be evaluated to determine whether the object is an obstruction. Additionally, in some instances, it can be determined whether the object is a long term obstruction that is expected to affecting the intended route of travel and/or remain at a current location for longer than a long term threshold period of time. Similarly, the object can be determined to be a short term obstruction that is expected to affect the intended route of travel and/or remain at a current location for less than the long term threshold period of time or less than a short term threshold of time, which may be different than the long term threshold period of time. Determining whether the object is a long term obstruction can be based on one or more factors such as, but not limited to, how long the object has been in the identified location (e.g., based on video processing from shopping facility cameras, from cameras of multiple different motorized transport units, and the like); based on a designation from a shopping facility worker (e.g., worker notifies the central computer system of a task being performed, such as stocking shelves at a given location where a box or palette of products is an obstruction of part or an entire aisle); a spill or other accident that may take time to clean up; equipment may be in a location (e.g., ladder, hoist, lift, etc.), and the like); based on a task assigned to a shopping facility worker (e.g., worker is instructed to perform a pick and retrieve products from a storage area and move those products to the sales floor such that a box, palette or the like is placed in an area that becomes an obstruction); and the like. Similarly, one or more factors can be determined in specifying the object and an expected short term obstruction or obstacle such as, but not limited to, detecting movement by the object; recognizing the object (e.g., another motorized transport unit, a movable item container, a human, etc.); based on how long the object has been in a given location (e.g., image and/or video processing); and the like.

The actions determined by the central computer system that are to be taken by the motorized transport unit are typically different when the object is determined to be a long term obstruction versus a short term obstruction. For example, the control circuit, in identifying the action to be taken may identify one or more route modifications that when implemented cause the motorized transport unit to move around the object when the object is a long term obstacle. Alternatively, the control circuit, in identifying the action to be taken, may identify one or more route modifications that when implemented cause the motorized transport unit to stop and wait for a period of time and then to proceed along the intended route of travel when the object is determined to be a short term obstruction.

As described above, in some implementations, the object may be identified. The identification can be based on one or more factors. For example, some embodiments utilize image processing to identify whether the object is a human (e.g., based on size and shape of the object). Further, some embodiments implement facial recognition to identify whether the object is a human and/or to determine whether the human can be identified as a specific customer (e.g., a customer currently associated with the motorized transport unit). The image processing and/or facial recognition can be performed on images and/or video from cameras of one or more motorized transport units, fixed cameras of the shopping facility, a camera of one or more movable item containers, a camera of one or more user interface units, other cameras, or a combination of two or more of such cameras. Some embodiments compare images of the object with a database of images of potential objects. In some instances, images of customers, workers, service or assistance dogs, and the like may be acquired as they enter the shopping facility, and these pictures may be used as part of the process of identifying an object. These images may be discarded upon detecting the customer, worker, etc. leaving the shopping facility. Further, in some embodiments, the central computer system may have access to a database of two-dimensional and/or three-dimensional images and/or scans of different products, of areas of the shopping facilities, the movable item containers, shipping boxes of products, pallets of products, and other such potential objects. These scans may be generated from laser scanners, or other such devices. Similarly, some embodiments include parameters about potential objects (e.g., size, shape, dimensions, and the like), that can be used in attempts to identify an object. Some embodiments further use shopping facility mapping information of the shopping facility, such as determining products that are within a general or threshold distance from where the object is detected and using this information as a filter to narrow potential products that may have fallen off of a shelf. Typically, embodiments use multiple sensors and other information in identifying an object.

Additionally or alternatively, the detected object is often differentiated from multiple other potential objects and/or obstacles. Further, the identified one or more actions to be taken can in part be dependent on the differentiation of the object from the multiple other potential objects or obstacles. For example, different actions may be selected when the object is a human than when the object is a product or pallet that is on the floor of an aisle. Similarly, different actions may be selected when the object is a customer associated with the motorized transport unit (e.g., implement instructions to follow the customer) than when the object is a customer not currently associated with the motorized transport unit (e.g., become associated with a customer and implement instructions to cooperate with a movable item container for use by the customer). In another example, the one or more actions identified to be implemented when the object is a child (e.g., issue an audible greeting, request the child move, etc.) are typically different than the one or more actions identified when the object is a movable item container (e.g., wait for the movable item to be moved, cooperate with the movable item container, etc.).

As described above, the central computer system typically receives several different types of route condition information that can be used to identify one or more objects that may affect the intended route of travel of one or more motorized transport units. The route condition information, whether received from a motorized transport unit or from one or more sources external to a motorized transport unit, can be evaluated to determine one or more relevant actions to be taken with regard to the object. In some implementations, the central computer system may apply a hierarchy or priority to certain route condition information over other route condition information and/or a hierarchy relative to a source of the route condition information.

Figure 7:
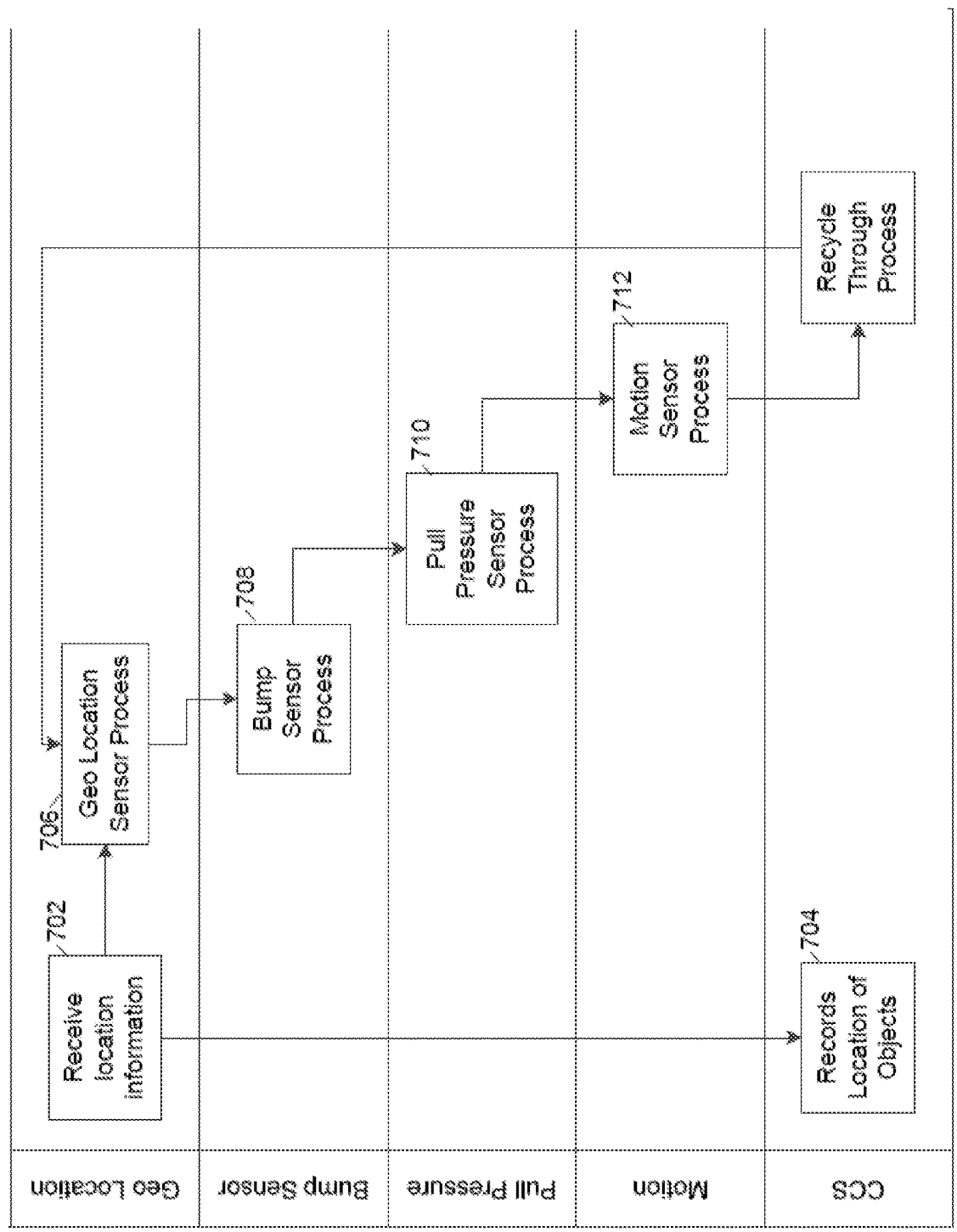
FIG. 7 shows a simplified functional block diagram of exemplary functional processes performed in evaluating route condition information, in accordance with some embodiments.

FIG. 7 shows a simplified block diagram of exemplary functional processes performed in evaluating route condition information, in accordance with some embodiments. The one or more functional processes are distributed processes preformed in part by the central computer system and other components in communication with the central computer system, such as the motorized transport units, sensors, location systems, and the like. In the example illustrated in FIG. 7, location information is received 702, and is typically recorded 704 by the central computer system. The location information is utilized in a geo-location process 706 that in part determines whether an object may affect a route at or near a determined location. A bump detection process 708 may be performed in response to a bump sensor on a motorized transport unit detecting contact with an external object. In some implementations, one or more motorized transport units may include a pull pressure sensor, and a pull pressure process 710 may be implemented based on information obtained from the pull pressure sensor. Further, some embodiments may implement a motion sensor process 712 in response to the utilization of motion sensor information obtained from one or more motion sensors of the motorized transport unit or external to a motorized transport unit. Typically, the evaluation of route condition information is a continuous process while controlling a motorized transport unit, and can repeat each of the steps and typically continuously repeats the steps. Other embodiments include additional or alternative processing of information, such as but not limited to image and/or video processing, distance processing, 3D scan processing, and other such processing. Further, as introduced above, some embodiments implement a hierarchy of route condition information and/or the evaluation of route condition information, and the processes of FIG. 7 shows one example of a hierarchy of processing route condition information. Other embodiments, however, implement different hierarchy, and the hierarchy may be dependent on one or more factors, such as whether the motorized transport unit is associated with a customer, whether the motorized transport unit has a threshold level of power, a location of the motorized transport unit, and other such factors.

Figure 8:
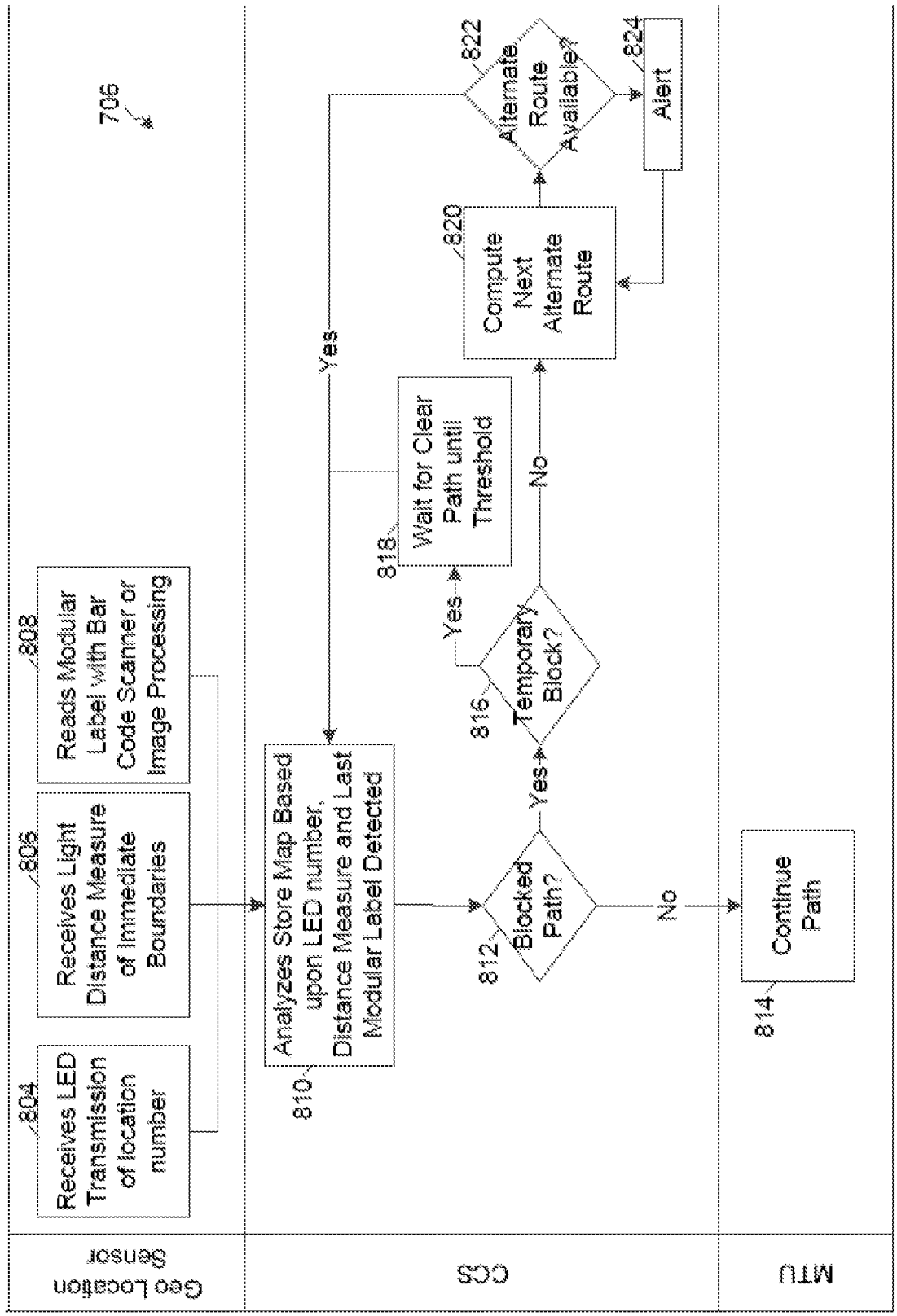
FIG. 8 shows a simplified functional diagram of an exemplary geo-location process, in accordance with some embodiments.

FIG. 8 shows a simplified functional diagram of an exemplary geo-location process 706, in accordance with some embodiments. In step 802, location sensor information is detected by one or more geo-location sensors. For example, a light detector and/or location detector system may detect and/or receive 804 light identifiers encoded by lights of the location detection system 116. In some instances, the light identifiers may be detected by sensors in the motorized transport unit and communicated to the central computer system. In step 806, some embodiments may further detect and/or receive distance measurements, such as measurements performed by one or more distance measurement units of a motorized transport unit providing distances measurements of an immediate surrounding and/or boundaries proximate the motorized transport unit. In step 808, some embodiments read and/or receive one or more machine readable codes, such as codes positioned and distributed throughout at least some of the areas into which motorized transport units are configured and/or authorized to travel, and can be communicated to the central computer system.

In step 810, the central computer system evaluates and/or analyzes the shopping facility geo-location information in determining a location of a motorized transport unit. Typically, this evaluation includes evaluating the location information relative to one or more store mappings of the known positioning of lights, racks, modulars, and the like. The evaluation of the location information can be used in cooperation with other route condition information, such as but not limited to image and/or video information, information from other motorized transport units, and the like. In step 812, the central computer system determines, based at least in part on the geo-location information, whether an intended route of travel is blocked. When the path is not blocked, the central computer system in step 814 continues to communicate one or more instructions to the motorized transport unit that are configured to cause the motorized transport unit to continue along the intended route, and/or determines not to modify the route of the motorized transport unit. When the route is obstructed, the central computer system in step 816 determines whether the obstruction is a temporary or short term obstruction. As described above, in some instances, the central computer system can evaluate the route condition information and additional route condition information, which can include the geo-location information, in determining whether an object is predicted to obstruct the intended route of travel for less than a short term threshold period of time. When it is determined that the obstruction is a short term obstruction, the process advances to step 818 to communicate one or more instructions to cause the motorized transport unit to slow, stop and/or wait in accordance with one or more parameters (e.g., speed, duration, etc.). The process then returns to step 810 to continue to evaluate and/or continuously evaluates the geo-location information and/or determine whether route changes should be implemented.

When the obstruction is not identified as a short term obstruction, the process continues to step 820 where the central computer system identifies one or more instructions to cause the motorized transport unit to go around the object and/or along an alternative route. Some embodiments further evaluate the alternate route in step 822 to confirm that the alternate route is available. When unavailable, an alarm or alert may be issued in step 824. Further, in some implementations, the process may optionally return to step 820 in attempts to identify another alternate route. When an alternate route cannot be located, the central computer system typically notifies one or more workers and awaits the obstacle to be moved and/or waits until alternative instructions provided.

Figure 9:
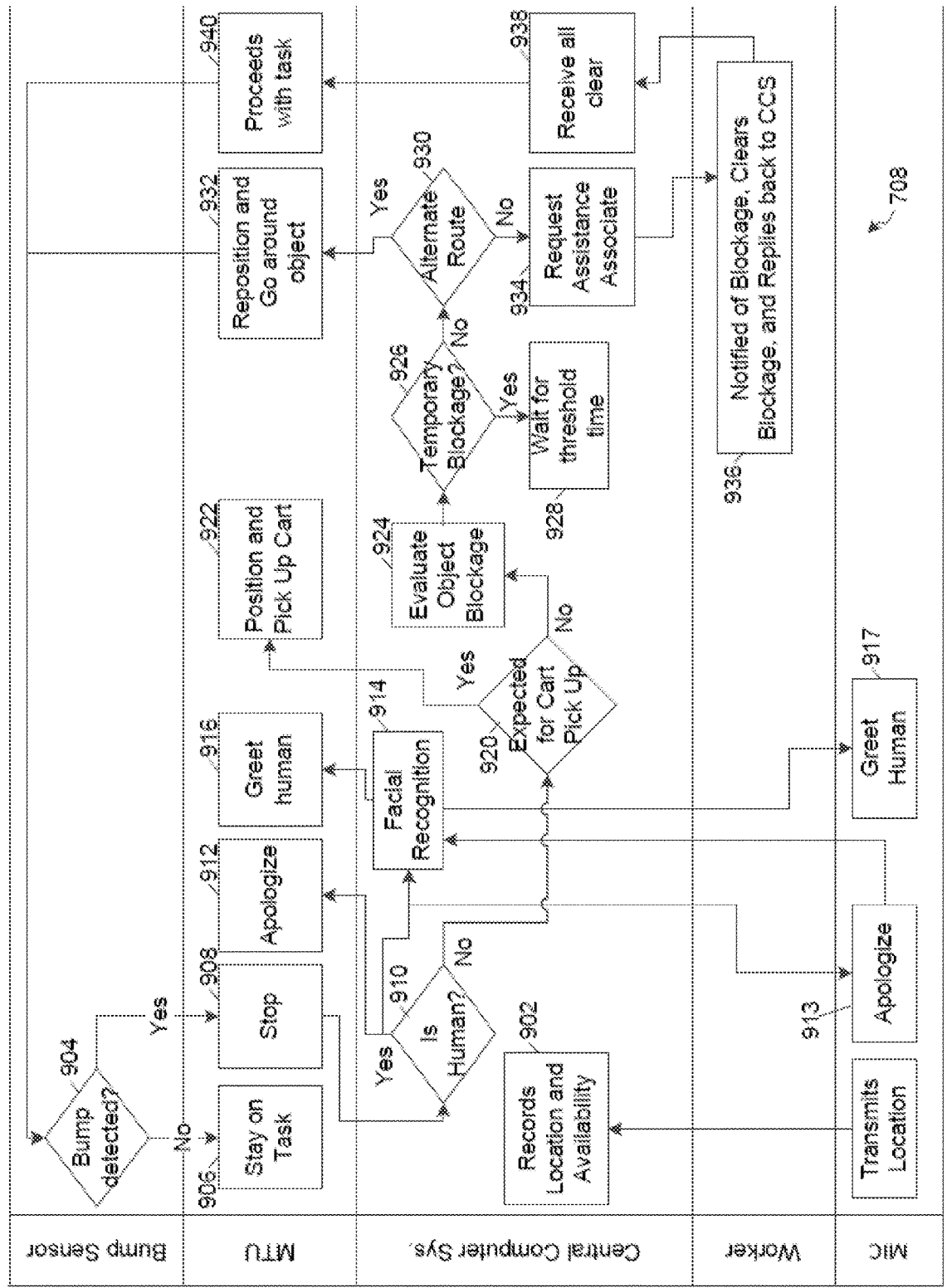
FIG. 9 shows a simplified functional diagram of an exemplary bump detection process, in accordance with some embodiments.

FIG. 9 shows a simplified functional diagram of an exemplary bump detection process 708, in accordance with some embodiments. In step 902, location information and/or availability information of one or more motorized transport units 102, movable item containers 104, docking stations 122, and other components are detected and recorded. The location information may be transmitted (e.g., from the motorized transport unit, the movable item container, etc.), or determined based on other information. In step 904, it is determined whether a bump sensor detects a bump. Typically, the motorized transport unit includes one or more bump sensors that are configured to detect when the motorized transport unit contacts an external object and/or abruptly stops. When there is no indication from the bump sensor of contacting an external object, the central computer system and/or the motorized transport unit, in step 906, does not interrupt the motorized transport unit and/or its route. Alternatively, in step 908, the motorized transport unit stops.

In some embodiments, the central computer system, in step 910, evaluates the route condition information, including the bump sensor information, and is configured to determine whether the external object that was contacted is a human. When it is determined that the external object is a human, the central computer system in some instances communications in steps 912-913 one or more instructions to the motorized transport unit and/or a user interface or other smart device cooperated with a movable item container to cause an audible apology to be issued. Some embodiments, in step 914, additional attempt to perform a facial recognition. When the human can be recognized, one or more instructions can be communicated in steps 916-917 to the motorized transport unit and/or a user interface or other smart device cooperated with a movable item container to greet the human (e.g., cause an audible greeting, display a greeting, and/or other such greetings).

Step 920 is entered when it is determined that the object contacted is not a human, and the central computer system determines whether the external contact was expected. For example, when a motorized transport unit is instructed to cooperate with a movable item container, the motorized transport unit typically contacts the movable item container one or more times in implementing the contact. In other instances, external contact may be expected when a motorized transport unit in instructed to push another motorized transport unit or other object. Accordingly, the external contact may be expected. When expected, the process advances to step 922 where an appropriate action is performed, such as issuing one or more instructions to cause the motorized transport unit to couple with the movable item container (e.g., pick up a portion of the movable item container).

When the external contact is not expected, some embodiments advance to step 924, where the route condition information can be considered in evaluating the object contacted. Some embodiments include step 926 where it is determined whether the object contacted is a temporary or short term obstruction. When it is determined that the obstruction is a short term obstruction, the process advances to step 928 to communicate one or more instructions to cause the motorized transport unit to slow, stop and/or wait in accordance with one or more parameters (e.g., speed, duration, etc.). When the obstruction is not a short term obstruction, some embodiments advance to step 930 to determine whether there is one or more alternate routes available. When an alternate route is available, some embodiments communicate one or more instructions in step 932 to cause the motorized transport unit to go around the object and along the alternative route.

When an alternate route is unavailable, a shopping facility worker may be notified in step 934. In step 936, the worker may notify the central computer system that the obstruction has been removed and/or the central computer system may determine that the obstruction is moved or an alternative route is now available. In step 938, the central computer system receives the notification from the worker that the route is clear and/or determines the route or alternate route is available. In step 940, an instruction is communicated to the motorized transport unit to proceed along the route or an alternative route. The bump process 708 may be continuously repeated and/or activated in response to a detection of contact with an external object. Further, in some instances, the bump process may be disabled when it is anticipated that the motorized transport unit is expected to contact an external object.

Figure 10:
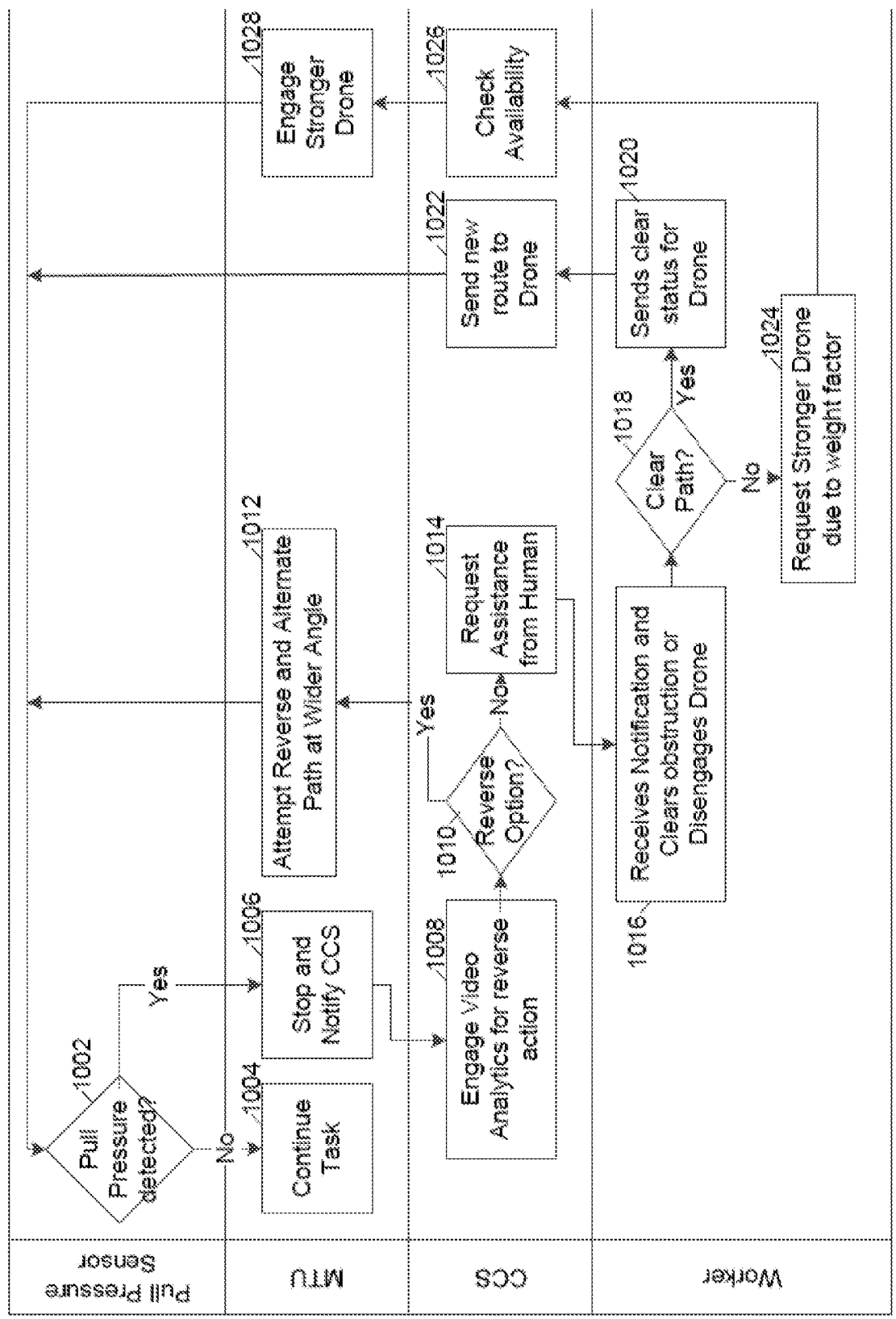
FIG. 10 shows a simplified functional diagram of an exemplary pull pressure process, in accordance with some embodiments.

FIG. 10 shows a simplified functional diagram of an exemplary pull pressure process 710, in accordance with some embodiments. In step 1002, one or more pull pressure sensors detect that an amount of pressure, force and/or power being applied by the motorized transport unit to move alone an intended route meets and/or exceeds a threshold (e.g., a pull pressure threshold). Additionally or alternatively, the pull sensor and/or the central computer system may be configured to detect a rapid change in the pull pressure or force (change greater than a threshold, within less than a threshold period of time). The pressure or force applied by the motorized transport unit may gradually increase as a customer adds products to a movable item container. In some instances, the pull pressure may abruptly change, such as in response to the motorized transport unit and/or the movable item container contacting an object, one or more wheels may get caught up on debris or other such object, customer or worker may grab a movable item container to prevent further movement, or other such occurrences. In step 1004, when the threshold is not met or exceeded, the motorized transport unit continues and/or the central computer system continues to allow the motorized transport unit to continue along an intended path and continues to communicate relevant instructions to cause the motorized transport unit to move as intended.

When the pull pressure threshold is met or exceeded, the process continues to step 1006 where the motorized transport unit stops and notifies the central computer system. In step 1008, the central computer system evaluates route condition information corresponding to the motorized transport unit sending the notification and/or corresponding to a location of the motorized transport unit. For example, in some instances, the central computer system may apply image and/or video analytics and/or processing in an attempt to identify one or more corrective actions. In step 1010, the central computer system determines whether an action, such as a reverse action or option would be effective in reducing the pull pressure below the threshold. In those instances when an action, such as the reverse action, would be effective, the process continues to step 1012 where the central computer system communicates one or more instructions to the motorized transport unit (e.g., instruction to cause the motorized transport unit to move along a wider route around a turn). The process, in some embodiments, continues to monitor and/or receive information from the pull pressure sensor and evaluate that information at step 1002.

When it is determined that an action would not be effective, some embodiments implement step 1014 issuing a notification or request to a shopping facility worker. For example, the central computer system may wirelessly communicate a notification to a user interface unit carried by a worker, display a notice on a display screen, or other such notification. In step 1016, the worker receives the notification and attempts to correct the issue pull pressure issue and/or clear a route for the motorized transport unit and/or the movable item container. In some embodiments, when the worker is successful in clearing the route and/or disengages the motorized transport unit, in step 1018, the worker notifies the central computer system in step 1020 (e.g., through the user interface unit, or the like) that the motorized transport unit is ready to proceed. In step 1022, the central computer system communicates one or more instructions to continue along an intended route and/or to advance along a different route (e.g., cause the motorized transport unit to moving along a wider route around a turn).

In some embodiments, when the worker is unsuccessful in clearing the route, the worker may notify the central computer system, and may indicate one or more issues that appear to be causing the pull pressure threshold to be exceeded (e.g., the weight of products within a movable item container being moved by a motorized transport unit, damage to a wheel of the motorized transport unit and/or the movable item container, etc.). In some instances the worker and/or the central computer system may determine that an additional motorized transport unit or a motorized transport unit with a greater pulling and/or pushing power may overcome the problem. As such, in step 1024 some embodiments issue a request for an additional or alternative motorized transport unit. In step 1026, the central computer system identifies one or more available additional motorized transport units or a stronger motorized transport unit, when available, and issues one or more instructions to direct the motorized transport unit or stronger motorized transport unit to proceed to the location and take relevant action. In step 1028, the additional and/or stronger motorized transport unit implements the instructions. Again, in some embodiments the process returns to and/or continues to monitor and/or receive information from the pull pressure sensor and evaluate that information at step 1002.

Figure 11:
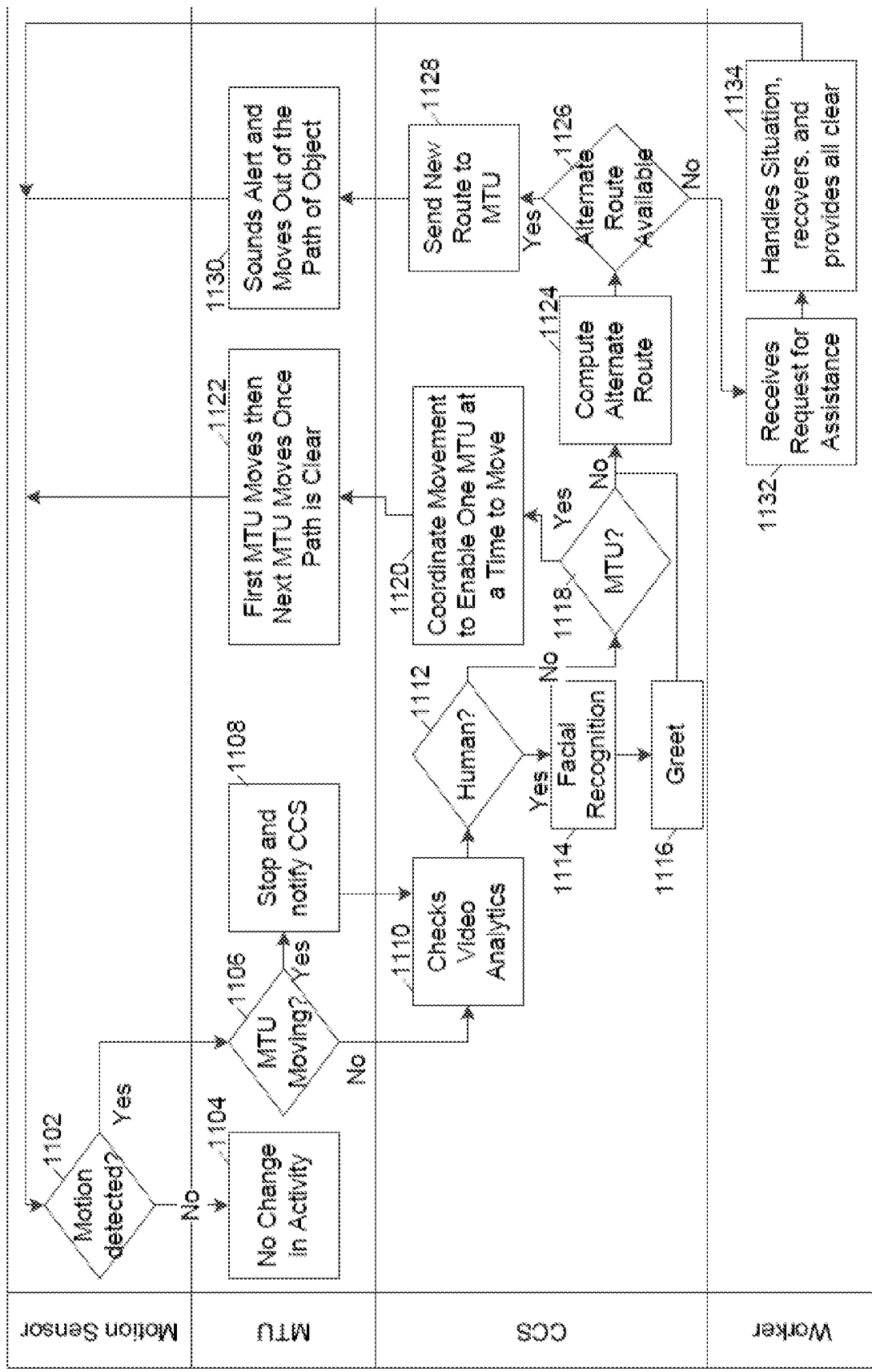
FIG. 11 shows a simplified functional diagram of an exemplary motion sensor process, in accordance with some embodiments.

FIG. 11 shows a simplified functional diagram of an exemplary motion sensor process 720, in accordance with some embodiments. In step 1102, it is determined whether one or more motion sensors of the motorized transport unit detect motion that is within a threshold distance and/or that exceeds a threshold amount of movement relative to a direction of travel of the motorized transport unit. When motion is not detected, or insufficient motion and/or motion less than a threshold occurs, the motorized transport unit continues in step 1104. In step 1106, the motorized transport unit determines whether the motorized transport unit is in motion. When in motion, the motorized transport unit initiates a stop in step 1108, and typically further notifies the central computer system of the motion sensor information and that the motorized transport unit has stopped.

In step 1110, the central computer system evaluates route condition information corresponding to the motorized transport unit sending the notification and/or corresponding to a location of the motorized transport unit. For example, in some instances, the central computer system may apply image and/or video analytics and/or processing in an attempt to identify a cause of the motion and/or one or more corrective actions. In step 1112, it is determined whether the cause of the motion is a human. When it is determined that a human did cause the motion, facial recognition may be implemented in step 1114, and in step 1116 an instruction may be communicated to the motorized transport unit and/or a movable item container to greet the human.

When it is determined that the motion is not caused by a human, some embodiments advance to step 1118 to determine whether the motion was caused by another motorized transport unit and/or a movable item container being moved by a motorized transport unit. In step 1120 one or more actions and/or movements by one or both the motorized transport units is determined and corresponding instructions are identified and communicated to one or both the motorized transport units. In step 1122, one or both the motorized transport units implement the relevant instructions to move along alternate routes and/or clear a route for the other motorized transport unit.

In some embodiments, when the detected motion does not appear to be caused by another motorized transport unit, step 1124 may be entered where an alternate route may be determined. For example, the central computer system, using the detected motion in combination with other route condition information, may detect that a customer is attempting to pass the motorized transport unit. Accordingly, an alternate route may include adjusting the route so that the motorized transport unit (and when relevant the movable item container) moves out of the customer's way when possible, and in some instances waits until the motorized transport unit can continue along the route. In step 1126 it is determined whether the alternate route is available. In step 1128, the central computer system communicates instruction to the motorized transport units relative to the alternate route. In step 1130, the motorized transport unit implements the instructions. In some embodiments, the instructions may further instruct the motorized transport unit to issue a warning (e.g., sound alert) that the motorized transport unit is going to move.

When an alternate route is unavailable and the potential object has not moved out of the way, some embodiments implement step 1132 with the central computer system communicating a notification or request and a shopping facility worker receiving the notification. In step 1134, the worker notifies the central computer system (e.g., through the user interface unit, or the like) that the motorized transport unit is ready to proceed. In some embodiments, the process returns to and/or continues to monitor and/or receive information from the motion sensor and evaluate that information at step 1102. For example, following steps 1122, 1130 and 1134, the process may return to await subsequent detections by the one or more motion sensors.

In some implementations, the motorized transport unit is implemented to stay in a particular area of the shopping facility, and take a particular route while traveling about. This route is expected to be free of permanent objects, and the central computer system can determine one or more actions to implement in response to detecting an object that may affect the route of travel (e.g., whether an obstacle is to be passed, whether the motorized transport unit is to wait until the obstacle is moved, etc.). In some embodiments, the motorized transport unit may stop in response to detecting and obstacles. Relevant information is communicated to the central computer system. In some applications, after a certain amount of time, that motorized transport unit may be instructed to make an audible sound indicating that there is an obstruction, and to indicate a plan to move out of a typical or designated path. Additionally, the central computer system may activate a counter to determine whether the obstacle is cleared within a threshold period of time. If the obstacle is cleared from the path, the central computer system communicates commands to cause the motorized transport unit to continue along an intended route. In some embodiments, when route is not cleared within a certain adjustable time tolerance, one or more cameras may be activated and/or directed to the area where the motorized transport unit is located to obtain addition route condition information, and/or alerting a shopping facility worker (e.g., through a user interface unit).

Again, the route condition information can include numerous different types of information from numerous different sensors and other sources. For example, in some embodiments, the motorized transport unit includes one or more bump sensors. In some implementations the motorized transport unit stops in response to detecting contact. Further, the central computer system may issue instructions and/or the motorized transport unit may implement predefined corrective instructions. For example, the motorized transport unit may implement one or more instructions to cause the motorized transport unit to turn at a 45 degree angle and attempt again to advance forward (e.g., an instructed or predefined distance, such as about 2 feet), and then subsequently attempt to move back into a previously intended route after. In some instances, when movement to the side is unsuccessful after a predefined number of attempts an alert may be issued to a worker. As another example, in some embodiments, the motorized transport unit may include one or more pull pressure sensor, which can indicate, for example, that the movable item container being pulled has hit something, that a threshold weight being pulled has been exceeded or the like. Similarly, if it is detected that it has suddenly become hard to pull, additional steps may be taken, such as attempting to acquire additional route condition information and/or take additional actions.

Some embodiments may include one or more motion sensor that can detect when the motorized transport unit approaches something or someone approaches the motorized transport unit, which can allow the central computer system to determine the distance and direction he can move. A one or more positioning and/or location sensors (e.g., indoor positioning sensor, light identifier detector, GPS sensor, etc.), which allows the central computer system to determine a location of the motorized transport unit. The central computer system can be configured to track and know not only where the motorized transport units are in the shopping facility or parking lot, but also identify where permanent objects are placed relative to their locations to allow the central computer system to issue relevant commands to avoid them, interact with them or take other such appropriate action. Some embodiments maintain a mapping of the shopping facility, and update and/or track the location of objects relative to the mapping, which allows routing to avoid objects, interact with intended objects, etc. This map may be maintained in part based on the motorized transport units encountering unexpected objects. The system further is configured to learn how to avoid obstacles, in part, by identifying where the objects are and how the object was previously avoided. Some embodiments include a trailing object sensor that detects dimensions of objects being pulled and/or receiving dimensions through communications. The knowledge of the size allows appropriate movement instructions (e.g., based on expected turning radius). The route may change based on what is being pulled.

Some embodiments utilize one or more cameras or other imaging systems to identify potential objects that may affect the route of travel, and further can be used to able to detect objects, identify objects and/or differentiate among types of objects, such as but not limited to sales floor boundaries, people, fixtures, movable item containers, motorized movable item containers, feature displays (e.g., four-ways, stack bases, pallets, and certain retail ready packaging displays), merchandise in aisles or on the floor, and other such objects. Different actions and/or adjustments to actions may be applied in response to object variations. The cameras may be on one or more motorized transport units, one or more movable item containers, one or more user interface units, one or more facility mounted cameras, or other such cameras, and often combinations of two or more of such cameras. Using the video and/or pictures from one or more cameras some embodiments identify specific objects, including for example people (both adults and children), other motorized transport units, movable item containers, fixtures, selling area boundaries, entrance and exit doors, cars and other vehicles, corrals for movable item containers, and understand avoidance and other policies for each type of object. The identification of objects allows the system to take action relative to the identified object. For example, when passing or nearing another customer, the motorized transport unit may issue an audible sound and/or words (e.g., "excuse me"), and follow other proper etiquette rules for the area of the country in which the system is implemented.

Again, some embodiments differentiate between objects. The difference between objects may be detected based on one or more of, but not limited to, variations in object appearance, such as scale, rotation, color and posture (e.g., difference between a standing person and a prone person, difference between a small box versus a pallet, etc.). The difference between objects may be detected based on one or more of, but not limited to, variations in object appearance, such as scale, rotation, color and posture (e.g., difference between a standing person and a prone person, difference between a small box versus a pallet, etc.).

Further, some embodiments employ facial recognition to recognize a person from a digital image or video and compare images. For example, some embodiments use and/or apply biometric images to assist in the performance of tasks (e.g., customer profile, tagalong steering, access controls, object recognition, etc.). Further, some embodiments combine sensory input, data on record, and/or evaluate additional characteristics of objects with similar silhouettes to differentiate between them. This allows computational objective versus obstacles decisions such as which box, box of what. Again, actions are typically different or adjusted according to programmed criteria and the identification of an object. Some embodiments are configured to recognize and/or read text, bar codes, labels, tags, signs, other markings, and the like in identifying and/or distinguishing objects.

Additionally, some embodiments are configured to accept verbal commands that are spoken by a customer or worker (e.g., "Stop", "Come Here", "Go Home!", and other such standard basic commands that are recognized by the central computer system and/or the motorized transport unit). Further, these commands typically can be accepted and/or recognized in multiple languages. Still further, in some implementation, each motorized transport unit is provided a name or other identifier (e.g., which may be prominently presented on the motorized transport unit), and the central computer system, and in some instances each motorized transport unit, is configured to recognize the name when spoken.

Some embodiments further utilize location information in tracking motorized transport units and identifying objects that may affect a route of travel. For example, some embodiments use light sensors on the motorized transport units that can extract data contained in visible and/or non-visible light spectrums emitted from lights at the shopping facility to determine location and path information. Further, the central computer system can use a combination of sensors on a particular motorized transport unit, other motorized transport units, as well as external sensors and data sources to determine item location and routing. In some embodiments, the central computer system may further distribute information to one or more motorized transport units regarding the intended route of travel of one or more other motorized transport units. Additionally, the central computer system uses the intended and/or determined route information of the multiple motorized transport units in determining optimal paths prior to and during movement activities.

Further, in detecting objects the system may identify one or more further actions with regard to a detected object. For example, in some embodiments, the system may identify an object as a movable item container and recognize that the movable item container has been abandoned, as it has determined that it has been there for more than a threshold period of time (e.g., 15 minutes, 30 minutes, or other time threshold). The central computer system may issue a notification to a shopping facility associate, issue one or more instructions to a motorized transport unit to move the movable item container, receive a notification from a motorized transport unit that it intends to move the movable item container when the motorized transport unit is not on another mission, and other such actions. Typically, the central computer system instructs the motorized transport unit where to take the abandoned movable item container (e.g., may depend on whether the movable item container is empty or not), and/or a designated location may be specified to re-locate abandoned movable item containers.

In some embodiments, apparatuses and methods are provided herein useful to providing control over movement of motorized transport units. In some embodiments, an apparatus providing control over movement of motorized transport units at a shopping facility comprises: a central computer system that is separate and distinct from a self-propelled motorized transport unit, wherein the central computer system comprises: a transceiver configured to receive communications from the motorized transport unit located at a shopping facility; a control circuit coupled with the transceiver; a memory coupled to the control circuit and storing computer instructions that when executed by the control circuit cause the control circuit to perform the steps of: obtain, from one or more of the communications received from the motorized transport unit, route condition information acquired by the motorized transport unit, wherein the route condition information comprises information corresponding to an intended route of travel by the motorized transport unit; obtain additional route condition information existing at the shopping facility and detected by one or more detectors external to the motorized transport unit; detect, in response to an evaluation of both the route condition information and the additional route condition information, an object at the shopping facility affecting the intended route of travel; identify, without user interaction and in response to detecting the object, an action to be taken by the motorized transport unit with respect to the detected object; and communicate one or more instructions to the motorized transport unit configured to cause the motorized transport unit to implement the action based on the detected object.

In some embodiments, a method of providing control over movement of motorized transport units at a shopping facility comprises: by a control circuit of an automated central computer system that is separate and distinct from a self-propelled motorized transport unit: obtaining, from one or more communications received from the motorized transport unit, route condition information acquired by the motorized transport unit, wherein the route condition information comprises information corresponding to an intended route of travel by the motorized transport unit; obtaining additional route condition information existing at the shopping facility and detected by one or more detectors external to the motorized transport unit; detecting, in response to an evaluation of both the route condition information and the additional route condition information, an object at the shopping facility affecting the intended route of travel; identifying, without user interaction and in response to detecting the object, an action to be taken by the motorized transport unit with respect to the detected object; and communicating one or more instructions to the motorized transport unit configured to cause the motorized transport unit to implement the action based on the detected object.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus providing control over movement of motorized transport units at a shopping facility, comprising:
   a central computer system that is separate and distinct from a self-propelled motorized transport unit, wherein the central computer system comprises:
      a transceiver configured to receive communications from the motorized transport unit located at a shopping facility;
      a control circuit coupled with the transceiver; and
      a memory coupled to the control circuit and storing computer instructions that when executed by the control circuit cause the control circuit to perform the steps of:
      obtain, from one or more of the communications received from the motorized transport unit, route condition information acquired by the motorized transport unit, wherein the route condition information comprises information corresponding to an intended route of travel by the motorized transport unit;
      obtain additional route condition information existing at the shopping facility and detected by one or more detectors external to the motorized transport unit;
      detect, in response to an evaluation of both the route condition information and the additional route condition information, an object at the shopping facility affecting the intended route of travel;
      identify, without user interaction and in response to detecting the object, an action to be taken by the motorized transport unit with respect to the detected object; and
      communicate one or more instructions to the motorized transport unit configured to cause the motorized transport unit to implement the action based on the detected object.

2. The apparatus of claim 1, wherein the control circuit is further configured to:
   identify that the motorized transport unit is associated with the object; and
   wherein the control circuit, in identifying the action, determines one or more route modifications to cause the motorized transport unit to follow the object as the object moves.

3. The apparatus of claim 1, wherein the route condition information comprises at least one of bump sensor information, motion sensor information, pull pressure sensor information, and trailing object sensor information.

4. The apparatus of claim 3, wherein the additional route condition information comprises video content received from one or more video cameras positioned at the shopping facility and remote from the motorized transport unit.

5. The apparatus of claim 1, wherein the control circuit is further configured to:
   differentiate the detected object from multiple other potential obstacles;
   wherein the identified actions is dependent on the differentiation of the object from the multiple other potential obstacles.

6. The apparatus of claim 1, wherein the control circuit is further configured to:
   identify the object as a specific customer currently associated with the motorized transport unit; and
   wherein the control circuit, in identifying the action, determines one or more route modifications to cause the motorized transport unit to lead the customer through at least a portion of the shopping facility.

7. The apparatus of claim 1, wherein the control circuit is further configured to:
   identify the object as a customer currently associated with the motorized transport unit; and
   wherein the control circuit, in identifying the action, determines route optimization to an intended product and communicates the route modifications to cause the motorized transport unit to move toward the intended product at the shopping facility.

8. The apparatus of claim 1, wherein the control circuit in identifying the action is configured to identify a modified route to be taken and identify that the modified route is a deviation from typical travel routes of the motorized transport units at the shopping facility; and
wherein the communicating the one or more instructions comprises communicating additional more precision movement instructions than typically communicated when the motorized transport unit is to travel along the typical travel routes to cause the motorized transport unit to implement the more additional precision movement instructions to travel along the modified route deviating from the typical travel routes.

9. The apparatus of claim 1, wherein the control circuit in identifying the action is configured to identify that the object is an object that the motorized transport unit is intended to engage and contact; and
wherein the communicating the one or more instructions comprises communicating more movement instructions to cause the motorized transport unit to contact and engage the object.

10. The apparatus of claim 1, wherein the control circuit in identifying the action to be taken by the motorized transport unit is configured to identify that the motorized transport unit is to operate in cooperation with one or more other motorized transport units;
communicate instructions to an additional motorized transport unit to be positioned relative to the motorized transport unit; and
wherein the control circuit in communicating the one or more instructions to the motorized transport unit configured to communicate the one or more instructions causing the motorized transport unit to operate in cooperation with the additional motorized transport unit.

11. The apparatus of claim 1, wherein the control circuit is configured to receive the additional route condition information from a separate motorized transport unit obtained from at least a first sensor of the separate motorized transport unit.

12. The apparatus of claim 1, wherein the control circuit is configured to receive the additional route condition information from a user interface unit carried by a person moving through the shopping facility.

13. The apparatus of claim 12, wherein the control circuit in receiving the additional route condition information from the user interface unit is configured to receive image information from a camera of the user interface unit.

14. The apparatus of claim 1, wherein the control circuit is configured to:
identify a detection of contact with the object from the route condition information acquired by the motorized transport unit;
confirm the contact is expected as a function of the motorized transport unit being directed to cooperate with the object; and
in communicating the one or more instructions the control circuit is configured to communicate a modified route based on the contact directing the motorized transport unit to be positioned relative to the object to allow cooperation with the object.

15. A method of providing control over movement of motorized transport units at a shopping facility, comprising:
by a control circuit of an automated central computer system that is separate and distinct from a self-propelled motorized transport unit:
obtaining, from one or more communications received from the motorized transport unit, route condition information acquired by the motorized transport unit, wherein the route condition information comprises information corresponding to an intended route of travel by the motorized transport unit;
obtaining additional route condition information existing at the shopping facility and detected by one or more detectors external to the motorized transport unit;
detecting, in response to an evaluation of both the route condition information and the additional route condition information, an object at the shopping facility affecting the intended route of travel;
identifying, without user interaction and in response to detecting the object, an action to be taken by the motorized transport unit with respect to the detected object; and
communicating one or more instructions to the motorized transport unit configured to cause the motorized transport unit to implement the action based on the detected object.

16. The method of claim 15, wherein the control circuit is further comprising:
identifying that the motorized transport unit is associated with the object; and
wherein the identifying the action comprises determining one or more route modifications to cause the motorized transport unit to follow the object as the object moves.

17. The method of claim 15, wherein the route condition information comprises at least one of bump sensor information, motion sensor information, pull pressure sensor information, and trailing object sensor information.

18. The method of claim 17, wherein the additional route condition information comprises video content received from one or more video cameras positioned at the shopping facility and remote from the motorized transport unit.

19. The method of claim 15, further comprising:
detecting an obstacle; and
differentiating the detected obstacle from multiple other potential obstacles;
wherein the identified actions is dependent on the differentiation of the obstacle from the multiple other potential obstacles.

* * * * *

UNITED STATES PATENT AND TRADEMARK OFFICE
CERTIFICATE OF CORRECTION

PATENT NO. : 10,570,000 B2
APPLICATION NO. : 15/692226
DATED : February 25, 2020
INVENTOR(S) : Donald R. High et al.

It is certified that error appears in the above-identified patent and that said Letters Patent is hereby corrected as shown below:

In the Specification

At Column 1, Line 52, delete "2016,and" and insert --2016, and--.

In the Claims

At Column 34, Line 32, Claim 16, delete "wherein the control circuit is".

Signed and Sealed this
Fourteenth Day of July, 2020

Andrei Iancu
*Director of the United States Patent and Trademark Office*